US011474395B2

(12) United States Patent
Malhotra et al.

(10) Patent No.: US 11,474,395 B2
(45) Date of Patent: Oct. 18, 2022

(54) BIREFRINGENT POLYMER BASED SURFACE RELIEF GRATING

(71) Applicant: Meta Platforms Technologies, LLC, Menlo Park, CA (US)

(72) Inventors: Tanya Malhotra, Redmond, WA (US); Liangyu Qiu, Rochester, NY (US); Andrew John Ouderkirk, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 278 days.

(21) Appl. No.: 16/719,796

(22) Filed: Dec. 18, 2019

(65) Prior Publication Data

US 2021/0191180 A1 Jun. 24, 2021

(51) Int. Cl.
| G02F 1/13 | (2006.01) |
| G02F 1/13363 | (2006.01) |
| C08L 67/00 | (2006.01) |
| G02B 5/18 | (2006.01) |
| G02B 27/01 | (2006.01) |
| F21V 8/00 | (2006.01) |

(52) U.S. Cl.
CPC .......... *G02F 1/13363* (2013.01); *C08L 67/00* (2013.01); *G02B 5/18* (2013.01); *G02B 27/0172* (2013.01); *G02B 6/0016* (2013.01)

(58) Field of Classification Search
CPC ..... G02F 1/13363; G02B 6/0016; G02B 5/18; G02B 27/0172; C08L 67/00
See application file for complete search history.

(56) References Cited

U.S. PATENT DOCUMENTS

| 6,020,944 A | * | 2/2000 | Hoshi | .................. | G02B 6/0038 |
| | | | | | 349/65 |
| 9,791,696 B2 | * | 10/2017 | Woltman | ........... | G02B 27/0103 |
| 10,061,124 B2 | * | 8/2018 | Tervo | ................. | G02B 27/4205 |

(Continued)

FOREIGN PATENT DOCUMENTS

| EP | 0787316 B1 | 5/2004 | | |
| JP | 2007323073 A | * 12/2007 | ........... | G02B 5/3016 |

(Continued)

OTHER PUBLICATIONS

Hong et al., See-through optical combiner for augmented reality head-mounted display: index-matched anisotropic crystal lens, Scientific Reports , 2753 , DOI:10.1038/s41598-017-03117-w, 2017. (Year: 2017).*

(Continued)

*Primary Examiner* — Peter Radkowski
(74) *Attorney, Agent, or Firm* — Weaver Austin Villeneuve & Sampson LLP

(57) ABSTRACT

A waveguide display includes a substrate transparent to at least one of visible or near infrared light, and a grating on the substrate. The grating includes ridges formed using a birefringent material and is configured to selectively couple incident light in a first polarization state into or out of the substrate. The birefringent material in the ridges is characterized by an optic axis parallel to a plane that includes a grating vector of the grating.

23 Claims, 16 Drawing Sheets
(2 of 16 Drawing Sheet(s) Filed in Color)

(56) References Cited

U.S. PATENT DOCUMENTS

| | | | |
|---|---|---|---|
| 2002/0005986 A1* | 1/2002 | Hebrink | G02B 5/0841 |
| | | | 359/489.15 |
| 2002/0090188 A1* | 7/2002 | Lazarev | G02B 6/03694 |
| | | | 385/128 |
| 2004/0258355 A1* | 12/2004 | Wang | G02B 6/1225 |
| | | | 385/37 |
| 2017/0131546 A1* | 5/2017 | Woltman | G02B 27/4205 |
| 2017/0315346 A1* | 11/2017 | Tervo | G02B 5/1819 |
| 2018/0239177 A1* | 8/2018 | Oh | G02B 27/0172 |
| 2018/0275350 A1* | 9/2018 | Oh | G02B 27/0172 |

FOREIGN PATENT DOCUMENTS

| | | | | |
|---|---|---|---|---|
| KR | 20170110542 A | * | 10/2017 | |
| WO | WO-2018175488 A1 | * | 9/2018 | ......... G02B 6/29316 |
| WO | WO-2020056384 A1 | * | 3/2020 | ......... G02B 27/0101 |

OTHER PUBLICATIONS

Emoto et al., (2010). Form birefringence in intrinsic birefringent media possessing a subwavelength structure. Applied optics. 49. 4355-61. 10.1364/AO.49.004355 (Year: 2010).*

Ono et al., "Polarization-sensitive diffraction in vector gratings combined with form birefringence in subwavelength-periodic structures fabricated by imprinting on polarization-sensitive liquid crystalline polymers," J. Opt. Soc. Am. B 31, 11-19 (2014) (Year: 2014).*

Lee et al., "Reflective polarization volume gratings for high efficiency waveguide-coupling augmented reality displays," Opt. Express 25, 27008-27014 (2017) (Year: 2017).*

Yin et al., "Chirped polarization volume grating with ultra-wide angular bandwidth and high efficiency for see-through near-eye displays," Opt. Express 27, 35895-35902 (2019) (Year: 2019).*

Kun Yin, Yun-Han Lee, Ziqian He, and Shin-Tson Wu, "Stretchable, flexible, rollable, and adherable polarization volume grating film" Opt. Express 27, 5814-5823 (2019) (Year: 2019).*

Han et al., "Enhanced phase shift in a zeroth-order beam from subwavelength grating structures formed in uniaxial birefringent materials," J. Opt. Soc. Am. A 13, 1728-1736 (1996) (Year: 1996).*

Ahmadi-Kandjani, et al., "Birefringence Properties and Surface Relief Grating Formation on Methylacrylate Polymers with Photochromic Side Chains", International Journal of Optics and Photonics, vol. 4, No. 1, Jan. 2010, pp. 23-29.

Hwang, et al., "Birefringence Grating and Surface Relief Grating on an Azo Polymer", Journal of the Korean Physical Society, vol. 43, No. 4, Oct. 2003, pp. 629-633.

Ono, et al., "Highly Controllable Form Birefringence in Subwavelength-period Grating Structures Fabricated by Imprinting on Polarization-sensitive Liquid Crystalline Polymers", Journal of the Optical Society of America B, vol. 29, No. 9, Sep. 2012, pp. 2386-2391.

Xu, et al., "Simulations of Birefringent Gratings as Polarizing Color Separator in Backlight for Flat-panel Displays", Opt. Express, vol. 15, No. 9, Apr. 30, 2007, pp. 5789-5800.

International Search Report and Written Opinion for International Application No. PCT/US2020/058448, dated Jan. 29, 2021, 11 Pages.

* cited by examiner

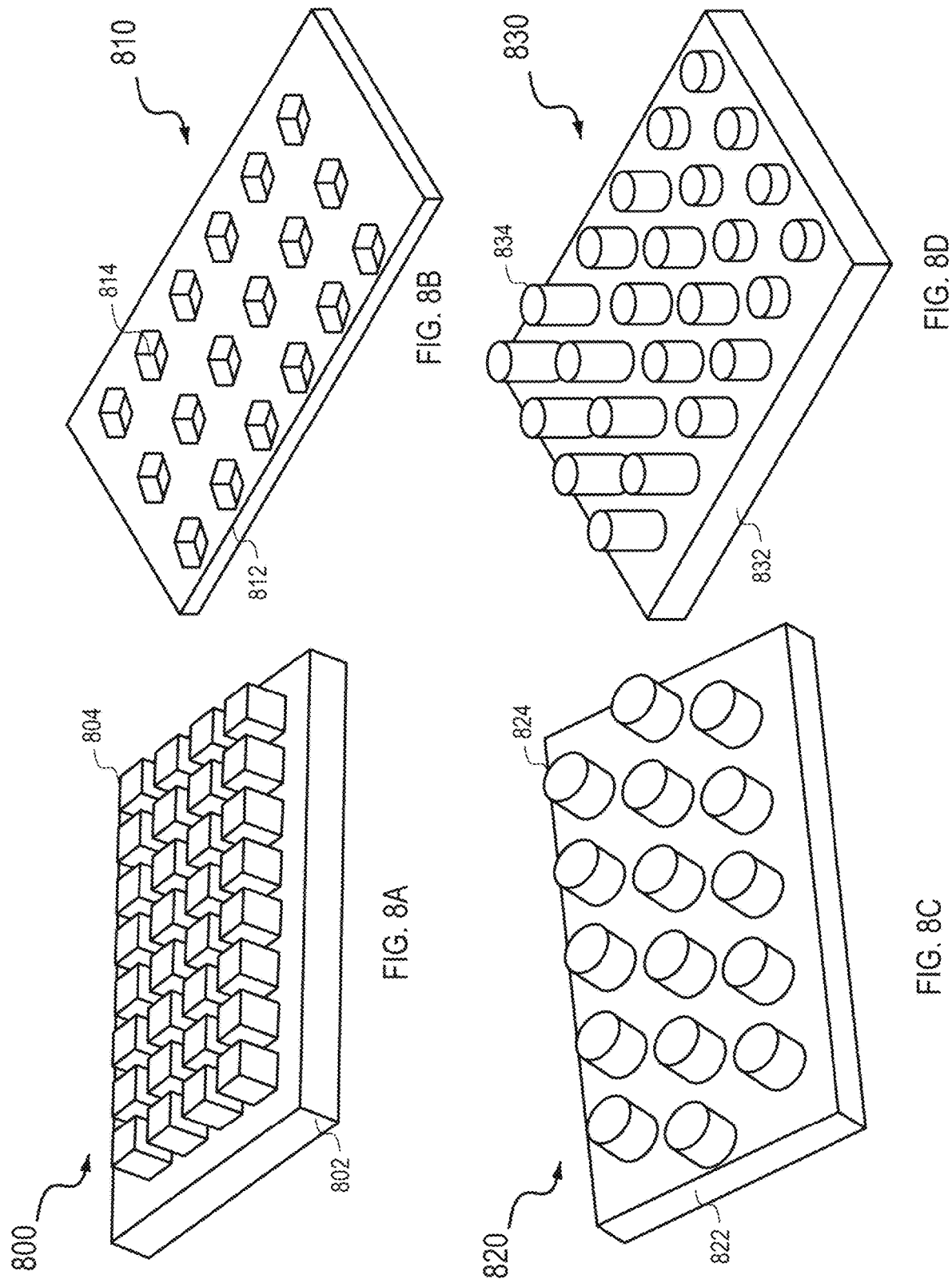

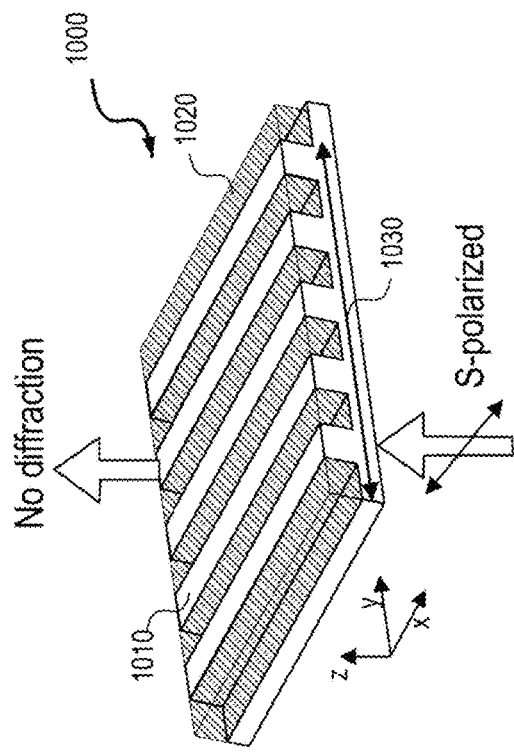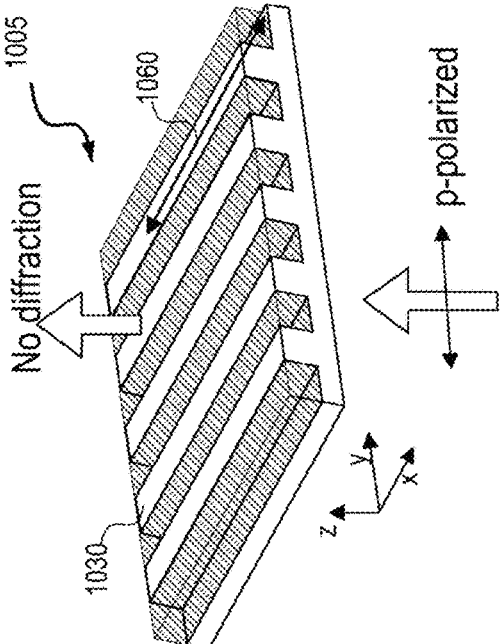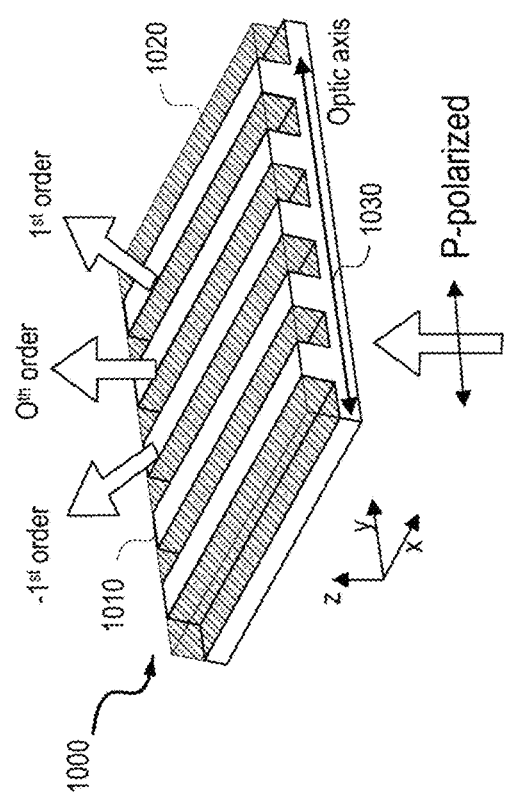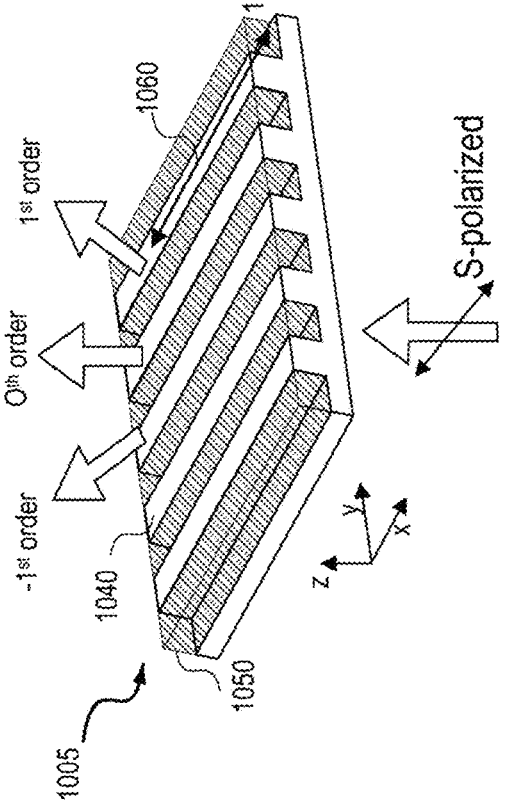

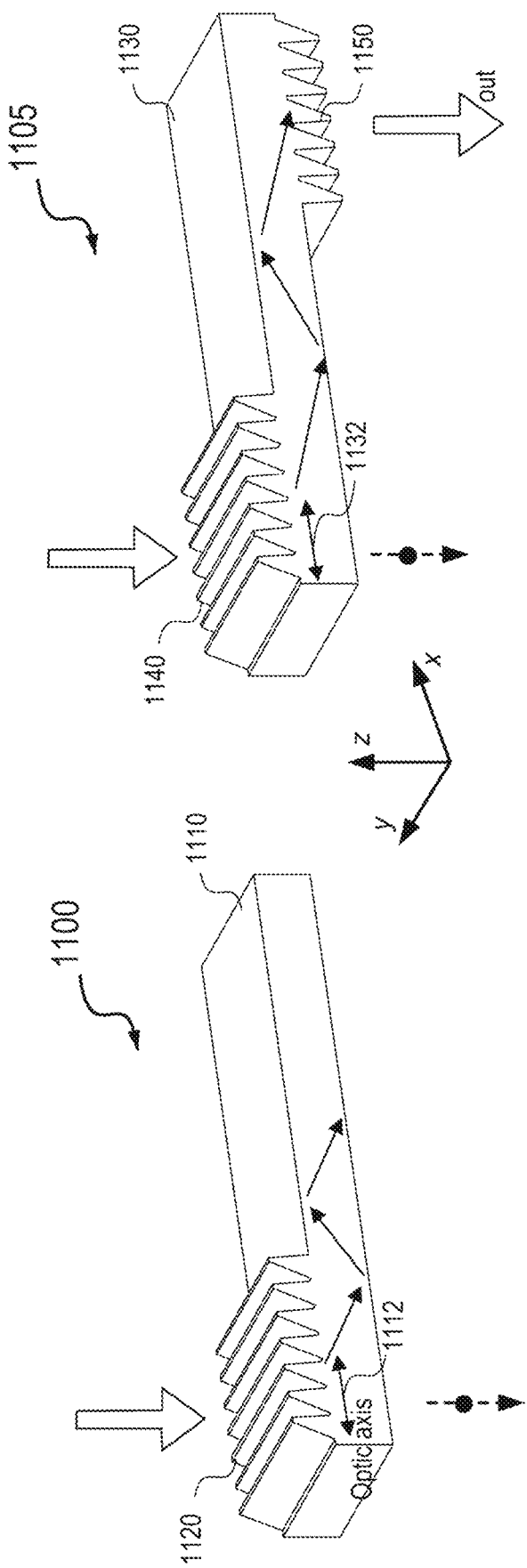

BIREFRINGENT POLYMER BASED SURFACE RELIEF GRATING

BACKGROUND

An artificial reality system, such as a head-mounted display (HMD) or heads-up display (HUD) system, generally includes a near-eye display (e.g., in the form of a headset or a pair of glasses) configured to present content to a user via an electronic or optic display within, for example, about 10-20 mm in front of the user's eyes. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through).

One example of an optical see-through AR system may use a waveguide-based optical display, where light of projected images may be coupled into a waveguide (e.g., a transparent substrate), propagate within the waveguide, and be coupled out of the waveguide at different locations. In some implementations, the light of the projected images may be coupled into or out of the waveguide using a diffractive optical element, such as a surface relief grating or a volume Bragg grating.

SUMMARY

This disclosure relates generally to surface relief gratings. More specifically, disclosed herein are surface relief gratings that are polarization sensitive and can preferentially diffract incident light of a certain polarization state. In one example, a surface relief grating may include ridges made of a birefringent material, where an optic axis of the birefringent material in the surface relief grating may be parallel to a plane that includes a grating vector of the surface relief grating. The surface relief grating may include an overcoat layer that is characterized by a refractive index approximately matching a refractive index of the refractive indices of the birefringent material. Various inventive embodiments are described herein, including devices, systems, methods, and the like.

According to some embodiments, a waveguide display may include a substrate transparent to at least one of visible or near infrared light, and a grating on the substrate. The grating may include ridges formed using a birefringent material and may be configured to selectively couple incident light in a first polarization state into or out of the substrate. The birefringent material in the ridges may be characterized by an optic axis parallel to a plane that includes a grating vector of the grating. In some embodiments, the plane may include the grating vector of the grating and a lateral extension direction of the ridges. The grating may include a transmissive grating or a reflective grating, and may include a one-dimensional grating or a two-dimensional grating.

In some embodiments, the birefringent material may be characterized by a birefringence greater than 0.05, such as greater than 0.1. The birefringent material may include at least one of a birefringent polymer, a birefringent ceramic, an aligned liquid crystal polymer, or aligned single crystal organic molecules. For example, the birefringent material may include polyethylene naphthalate (PEN) or polyethylene terephthalate. In some embodiments, the birefringent material may include a uniaxial birefringent material or a biaxial birefringent material. In some embodiments, the birefringent material in the ridges may be characterized by a higher index axis parallel to the plane that includes the grating vector of the grating.

In some embodiments, the waveguide display may further include an overcoat layer characterized by a refractive index matching a lower refractive index of the birefringent material. In some embodiments, the grating may be configured to selectively couple the incident light in the first polarization state into the substrate at a first angle such that the incident light coupled into the substrate propagates within the substrate through total internal reflection. In some embodiments, the waveguide display may include a second grating configured to selectively couple the incident light in the first polarization state and propagating within the substrate out of the substrate. In some embodiments, the waveguide display may also include a light source or a polarizer configured to generate the incident light in the first polarization state.

In some embodiments, the waveguide display may include a polarization selective reflective layer on the substrate and configured to reflect light in a second polarization state different from the first polarization state, where the polarization selective reflective layer and the grating may be on opposite sides of the substrate. In some embodiments, the waveguide display may include a second grating on the substrate and configured to reflectively diffract light in the second polarization state, where the second grating and the grating may be on opposite sides of the substrate.

According to certain embodiments, a surface relief grating may include a substrate and a plurality of ridges formed using a birefringent material. The birefringent material in the plurality of ridges may be characterized by an optic axis parallel to a plane that includes a grating vector of the surface relief grating such that the surface relief grating may selectively couple incident light in a first polarization state into or out of the substrate. In some embodiments, the substrate may include a reflective surface. In some embodiments, the plurality of ridges may include a two-dimensional array of three-dimensional microstructures. In some embodiments, the plurality of ridges may be characterized by a pitch greater than a wavelength of the incident light in the surface relief grating. In some embodiments, the two-dimensional array of three-dimensional microstructures may include at least one of cylindrical pillars, cuboidal pillars, cavities, or pyramids.

In some embodiments, the birefringent material may include a uniaxial or biaxial birefringent material that may include at least one of a birefringent polymer, a birefringent ceramic, an aligned liquid crystal polymer, or aligned single crystal organic molecules, and may be characterized by a birefringence greater than 0.1. In some embodiments, the birefringent material may include a uniaxial birefringent material and the optic axis may be parallel to a polarization direction of the incident light in the first polarization state. In some embodiments, the surface relief grating may include an overcoat layer on the plurality of ridges, where the overcoat layer may be characterized by a refractive index matching a refractive index (e.g., a lower or a higher refractive index) of the birefringent material.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments are described in detail below with reference to the following figures.

FIGS. 8A-8D illustrate examples of 2-dimensional diffraction gratings according to certain embodiments.

FIG. 10A illustrates diffraction of p-polarized wave by an example of a grating including a uniaxial birefringent material with a first optical axis direction according to certain embodiments. FIG. 10B illustrates diffraction of s-polarized wave by the example of grating including the uniaxial birefringent material with the first optical axis direction according to certain embodiments. FIG. 10C illustrates diffraction of s-polarized wave by an example of a grating including a uniaxial polymer with a second optical axis direction according to certain embodiments. FIG. 10D illustrates diffraction of p-polarized wave by the example of grating including the uniaxial polymer with the second optical axis direction according to certain embodiments.

FIG. 11A illustrate an example of a surface relief grating including a birefringent material and used as an input coupler for a waveguide display according to certain embodiments. FIG. 11B illustrate examples of surface relief gratings including birefringent materials and used as couplers in a waveguide display according to certain embodiments.

Figure 1:
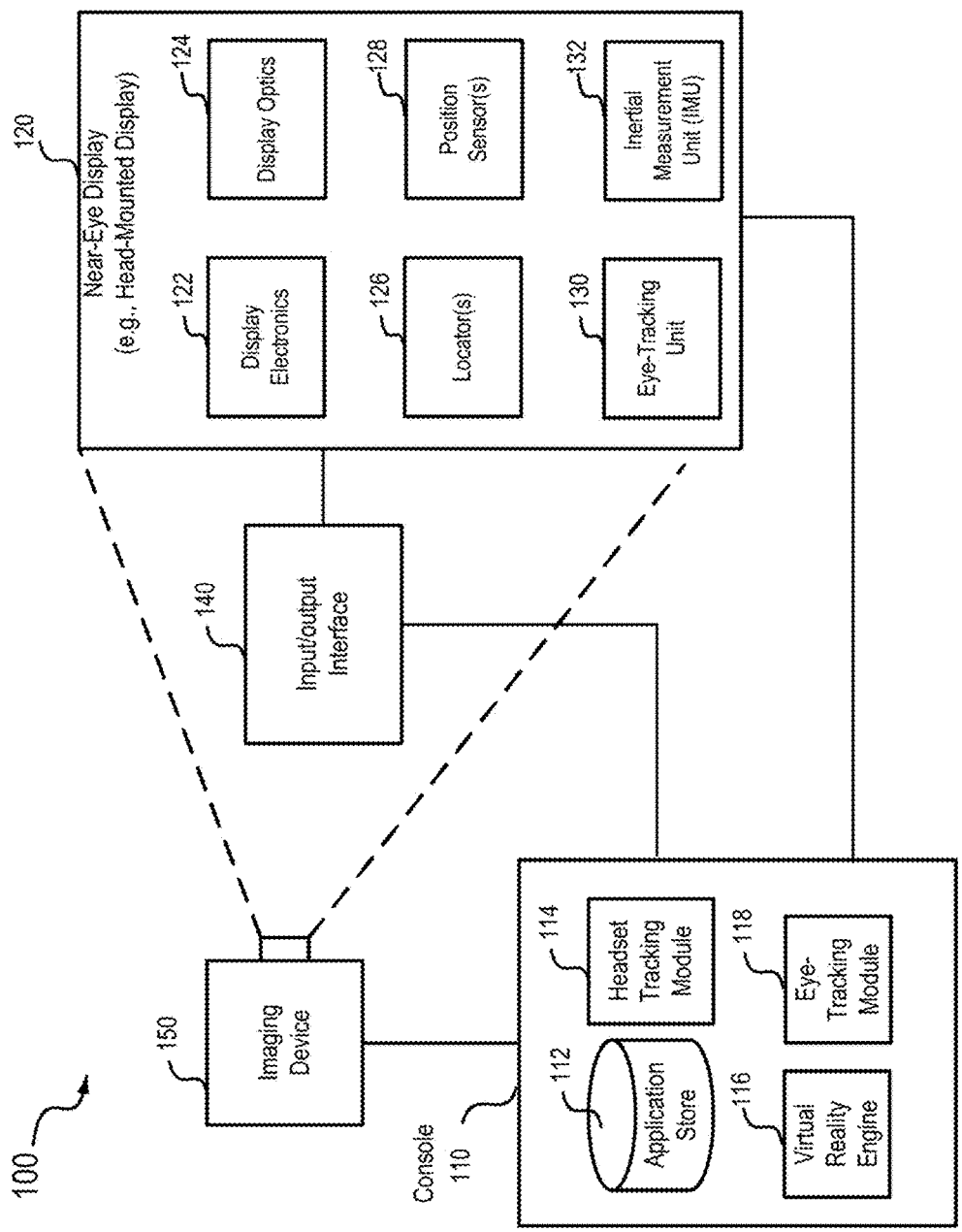
FIG. 1 is a simplified block diagram of an example of an artificial reality system environment including a near-eye display system according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to surface relief gratings. More specifically, disclosed herein are surface relief gratings that include birefringent materials and thus are polarization sensitive. In one example, a surface relief grating may include ridges made of a birefringent material, where an optic axis of the birefringent material in the surface relief grating may be parallel to a plane that includes a grating vector of the surface relief grating, such as parallel to the grating vector. The surface relief grating may include an overcoat layer that is characterized by a refractive index close or equal to a lower refractive index of the birefringent material. The surface relief grating may preferentially diffract incident light of a first polarization state over incident light of a different polarization state. Various inventive embodiments are described herein, including devices, systems, methods, and the like.

In a waveguide-based display system, the overall efficiency may be a function of the efficiencies of individual components in the display system and the coupling efficiencies between the individual components. In a simplified example, the overall efficiency $\eta_{tot}$ of a waveguide-based display system may be determined by $\eta_{tot}=\eta_{EQE}\times\eta_{in}\times\eta_{out}$, where $\eta_{EQE}$ is the external quantum efficiency of a light emitting device (e.g., a light emitting diode (LED) or an LED array), $\eta_{in}$ is the in-coupling efficiency of display light from the light emitting device into the waveguide, and $\eta_{out}$ is the out-coupling efficiency of the display light from the waveguide towards the user's eye. Thus, the overall efficiency $\eta_{tot}$ can be improved by improving one or more of $\eta_{EQE}$, $\eta_{in}$, and $\eta_{out}$. For example, the in-coupling efficiency $\eta_{in}$ of the display light from the light emitting device into the waveguide can be improved by generating polarized light by the light emitting device and coupling the polarized light into the waveguide using a polarization-sensitive grating coupler that has a high diffraction efficiency for light of certain polarization states or directions. Similarly, it may be desirable to couple light of certain polarization states out of the waveguide towards the user's eye, for example, to change the location of the image plane using polarization-dependent optical components to overcome the vergence-accommodation conflict.

According to certain embodiments, a birefringent polymer or other optically anisotropic materials with different refractive indices for light with different light polarization directions may be used to make polarization sensitive surface relief grating couplers. In one example, the optically anisotropic materials may include an uniaxial birefringent polymer with a unique refractive index for light vibrating along one direction (e.g., the optic axis) and may be optically isotropic for light vibrating along the other two directions. The grating grooves may be overcoated or otherwise filled with a material (e.g., an optically isotropic polymer or a dielectric material) having a refractive index matching one (e.g., a lower one) of the refractive index of the birefringent polymer. Therefore, light with a certain polarization direction (e.g., parallel to the optic axis of the birefringent polymer) may be subject to different refractive indices at the grating ridges and grating grooves and thus may be diffracted, while light with a different polarization direction (e.g., perpendicular to the optic axis of the birefringent polymer) may be subject to the same refractive index at the grating ridges and grating grooves and thus may not be diffracted. As such, the grating may more preferentially and efficiently diffract light with a certain polarization, such as light from a light source that generates substantially linearly polarized light with a higher external quantum efficiency or light polarized using a polarizer.

In some embodiments, the optically anisotropic material may include a uniaxial birefringent material or a biaxial birefringent material. The optically anisotropic material may have a birefringence greater than about 0.05-0.1, greater than about 0.15, greater than about 0.2, or greater than about 0.5. The birefringent material may include, for example, at least one of polyethylene naphthalate (PEN) or polyethylene terephthalate (PET); birefringent ceramics (e.g., calcite and other single crystal inorganics), aligned liquid crystal polymer (LCP) including polymer/LCP mixtures, or aligned epitaxial single crystal organic molecules (e.g., anthracene). The surface relief gratings can have any suitable grating profiles in the cross section, such as square wave gratings, slanted gratings, sinusoidal gratings, blazed gratings, variable depth grating, or the like, made using, for example, nanoimprint lithography or photolithography techniques. The surface relief grating can have refractive index modulation in one, two, or three dimensions.

In the following description, various inventive embodiments are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (μLED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be an LED, a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

Figure 2:
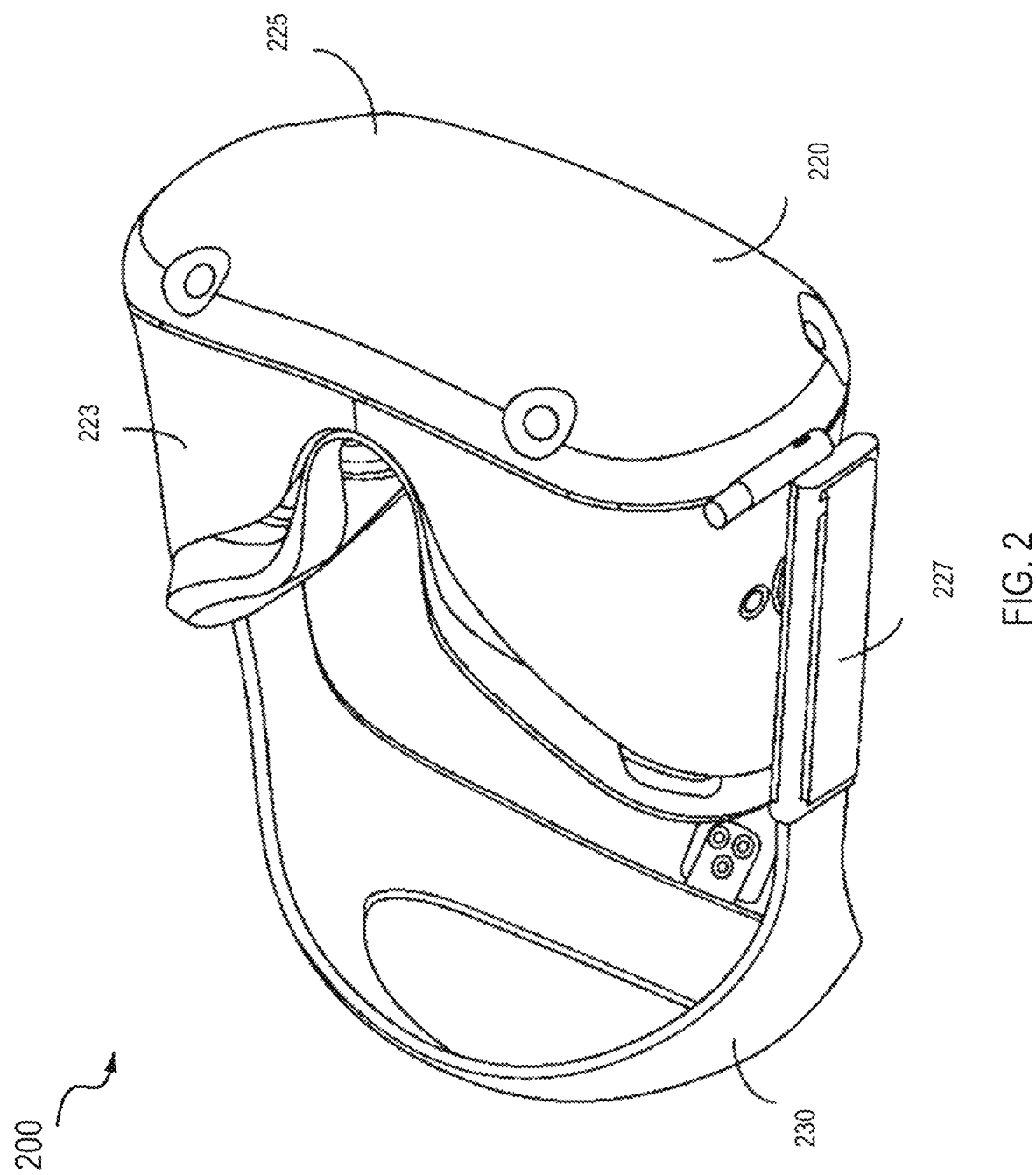
FIG. 2 is a perspective view of an example of a near-eye display system in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a µLED display, an AMOLED, a TOLED, some other display, or any combination thereof. HMD device 200 may include two eyebox regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
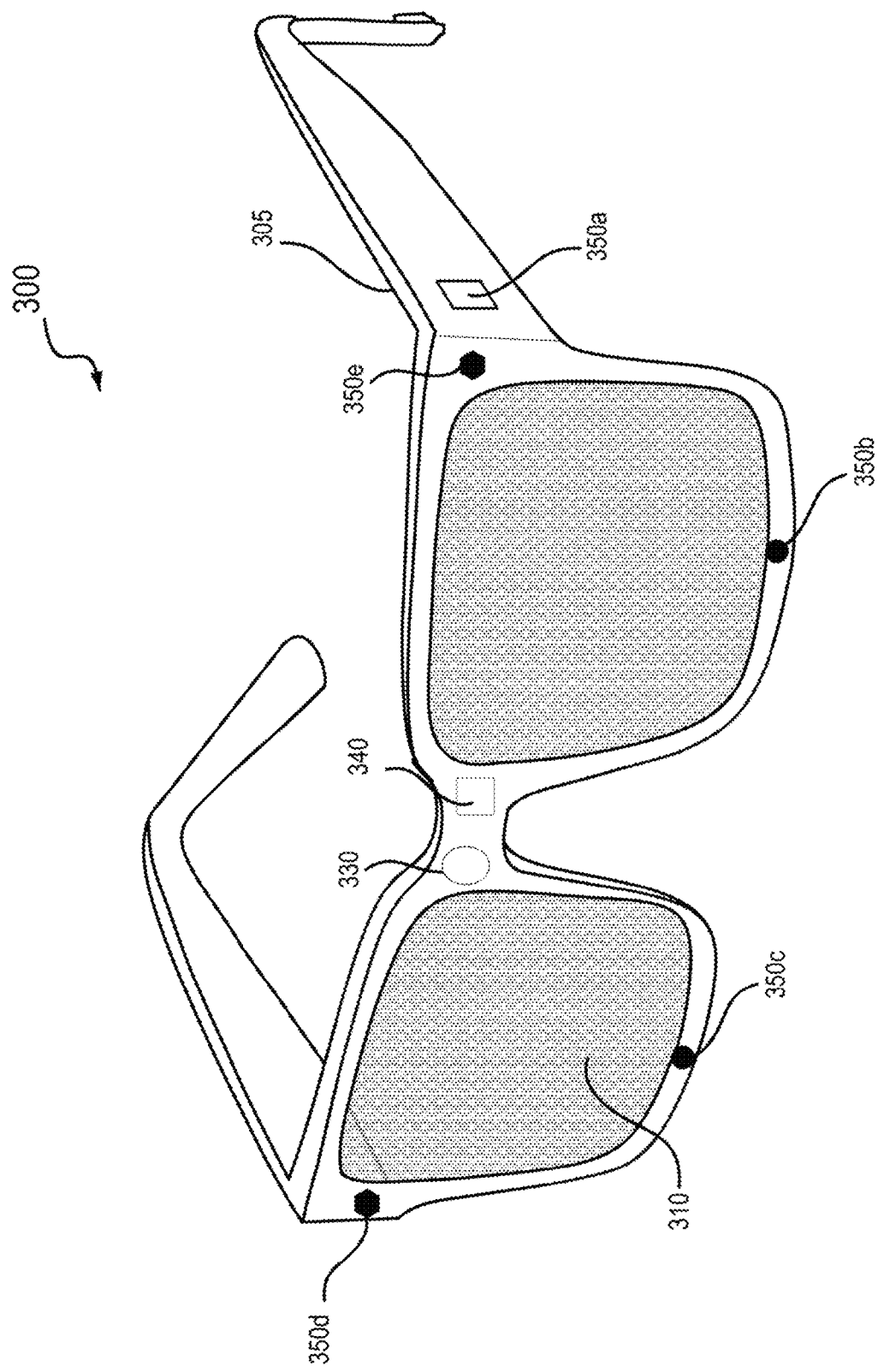
FIG. 3 is a perspective view of an example of a near-eye display system in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light pattern onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

The user experience of using an artificial reality system may depend on several characteristics of the optical system, including field of view (FOV), image quality (e.g., angular resolution), size of the eyebox (to accommodate for eye and head movements), and brightness of the light (or contrast) within the eyebox. Field of view may refer to the angular range of the image as seen by the user, such as measured in degrees as observed by one eye (for a monocular HMD) or both eyes (for either biocular or binocular HMDs). The human visual system may have a total binocular FOV of about 200° (horizontal) by 130° (vertical). To create a fully immersive visual environment, a large FOV is desirable because a large FOV (e.g., greater than about 60°) may provide a sense of "being in" an image, rather than merely viewing the image. Smaller fields of view may also preclude some important visual information. For example, an HMD system with a small FOV may use a gesture interface, but the users may not see their hands in the small FOV to be sure that they are using the correct motions. On the other hand, wider fields of view may be achieved using larger displays or optical systems, which may influence the size, weight, cost, and comfort of using the HMD.

Resolution may refer to the angular size of a displayed pixel or image element appearing to a user, or the ability for the user to view and correctly interpret an object as imaged by a pixel and/or other pixels. The resolution of an HMD may be specified as the number of pixels on the image source for a given FOV value, from which an angular resolution may be determined by dividing the FOV in one direction by the number of pixels in the same direction on the image source. For example, for a horizontal FOV of 40° and 1080 pixels in the horizontal direction on the image source, the corresponding angular resolution may be about 2.2 arc-minutes, compared with the one-arc-minute resolution associated with Snellen 20/20 human visual acuity.

In some cases, the eyebox may be a two-dimensional box in front of the user's eye, from which the displayed image from the image source may be viewed. If the pupil of the user moves outside of the eyebox, the displayed image may not be seen by the user. For example, in a non-pupil-forming configuration, there exists a viewing eyebox within which there will be unvignetted viewing of the HMD image source, and the displayed image may vignette or may be clipped but may still be viewable when the pupil of user's eye is outside of the viewing eyebox. In a pupil-forming configuration, the image may not be viewable outside the exit pupil.

The fovea of a human eye, where the highest resolution may be achieved on the retina, may correspond to an FOV of about 2° to about 3°. Thus, the eye may rotate in order to view off-axis objects with a highest resolution. The rotation of the eye to view the off-axis objects may introduce a translation of the pupil because the eye rotates around a point that is about 10 mm behind the pupil. In addition, a user may not always be able to accurately position the pupil (e.g., having a radius of about 2.5 mm) of the user's eye at an ideal location in the eyebox. Furthermore, in some environments where the HMD is used, for example, when the HMD is used in a moving vehicle or designed to be used while the user is moving on foot, it may be desirable that the eyebox is larger to allow for movement of the user's eye and/or head relative to the HMD.

Thus, the optical system of the HMD may need to provide a sufficiently large exit pupil or viewing eyebox for viewing the full FOV with full resolution, in order to accommodate the movements of the user's pupil relative to the HMD. For example, in a pupil-forming configuration, a minimum size of 12 mm to 15 mm may be desired for the eyebox or exit pupil. If the eyebox is too small, minor misalignments between the eye and the HMD may result in at least partial loss of the image, and the user experience may be substantially impaired. In general, the lateral extent of the eyebox is more critical than the vertical extent of the eyebox. This may be in part due to the significant variances in eye separation distance between users, and the fact that misalignments to eyewear tend to more frequently occur in the lateral dimension and users tend to more frequently adjust their gaze left and right, and with greater amplitude, than adjusting the gaze up and down. Thus, techniques that can increase the lateral dimension of the eyebox may substantially improve a user's experience with an HMD. On the other hand, the larger the eyebox, the larger the optics and the heavier and bulkier the near-eye display device may be.

In order to view the displayed image against a bright background, the image source of an AR HMD may need to be sufficiently bright, and the optical system may need to be efficient to provide a bright image to the user's eye such that the displayed image may be visible in a background including strong ambient light, such as sunlight. The optical system of an HMD may be designed to concentrate light in the eyebox. When the exit pupil or the eyebox is large, an image source with high power may be used to provide a bright image viewable within the large eyebox. Thus, there may be trade-offs among the size of the eyebox, cost, brightness, optical complexity, image quality, and size and weight of the optical system.

Figure 4:
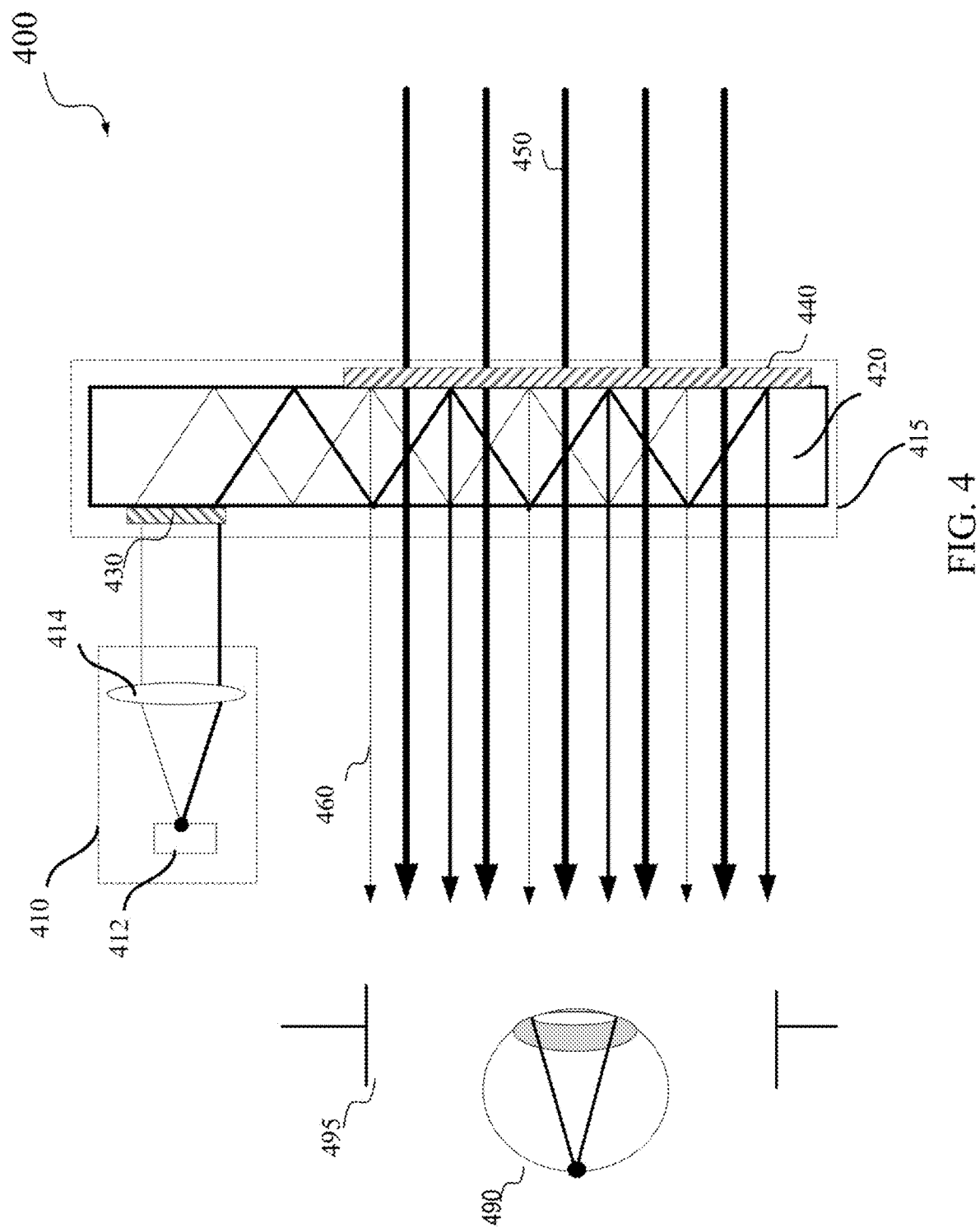
FIG. 4 illustrates an example of an optical see-through augmented reality system including a waveguide display for exit pupil expansion according to certain embodiments.

FIG. 4 illustrates an example of an optical see-through augmented reality system 400 including a waveguide display for exit pupil expansion according to certain embodiments. Augmented reality system 400 may include a projector 410 and a combiner 415. Projector 410 may include a light source or image source 412 and projector optics 414. In some embodiments, light source or image source 412 may include one or more micro-LED devices. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, an LED, a superluminescent LED (SLED), and/or a micro-LED described above. In some embodiments, image source 412 may include a plurality of light sources (e.g., an array of micro-LEDs described above) each emitting a monochromatic image light corresponding to a primary color (e.g., red, green, or blue). In some embodiments, image source 412 may include three two-dimensional arrays of micro-LEDs, where each two-dimensional array of micro-LEDs may include micro-LEDs configured to emit light of a primary color (e.g., red, green, or blue). In some embodiments, image source 412 may include an optical pattern generator, such as a spatial light modulator. Projector optics 414 may include one or more optical components that can condition the light from image source 412, such as expanding, collimating, relaying, scanning, or projecting light from image source 412 to combiner 415. The one or more optical components may include, for example, one or more lenses, liquid lenses, mirrors, free-form optics, apertures, and/or gratings. For example, in some embodiments, image source 412 may include one or more one-dimensional arrays or elongated two-dimensional arrays of micro-LEDs, and projector optics 414 may include one or more one-dimensional scanners (e.g., micro-mirrors or prisms) configured to scan the one-dimensional arrays or elongated two-dimensional arrays of micro-LEDs to generate image frames. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Combiner 415 may transmit at least 50% of light in a first wavelength range and reflect at least 25% of light in a second wavelength range. For example, the first wavelength range may be visible light from about 400 nm to about 650 nm, and the second wavelength range may be in the infrared band, for example, from about 800 nm to about 1000 nm. Input coupler 430 may include a volume holographic grating or another diffractive optical element (DOE) (e.g., a surface relief grating (SRG)), a slanted reflective surface of substrate 420, or a refractive coupler (e.g., a wedge or a prism). Input coupler 430 may have a coupling efficiency of greater than 30%, 40%, 75%, 90%, or higher for visible light. Visible light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, ceramic, or the like. A thickness of the substrate may range from, for example, less than about 1 mm to about 10 mm or more. Substrate 420 may be transparent to visible light.

Substrate 420 may include or may be coupled to a plurality of output couplers 440 each configured to extract at least a portion of the light guided by and propagating within substrate 420 from substrate 420, and direct extracted light 460 to an eyebox 495 where an eye 490 of the user of augmented reality system 400 may be located when augmented reality system 400 is in use. The plurality of output couplers 440 may replicate the exit pupil to increase the size of eyebox 495, such that the displayed image may be visible in a larger area. As input coupler 430, output couplers 440 may include grating couplers (e.g., volume holographic gratings or surface relief gratings), other diffraction optical elements (DOEs), prisms, etc. Output couplers 440 may have different coupling (e.g., diffraction) efficiencies at different locations. Substrate 420 may also allow light 450 from the environment in front of combiner 415 to pass through with little or no loss. Output couplers 440 may also allow light 450 to pass through with little loss. For example, in some implementations, output couplers 440 may have a very low diffraction efficiency for light 450 such that light 450 may be refracted or otherwise pass through output couplers 440 with little loss, and thus may have a higher intensity than extracted light 460. As a result, the user may be able to view combined images of the environment in front of combiner 415 and images of virtual objects projected by projector 410. In some implementations, output couplers 440 may have a high diffraction efficiency for light 450 and may diffract light 450 to certain desired directions (i.e., diffraction angles) with little loss.

In some embodiments, projector 410, input coupler 430, and output coupler 440 may be on any side of substrate 420. Input coupler 430 and output coupler 440 may be reflective gratings (also referred to as reflection gratings) or transmissive gratings (also referred to as transmission gratings) to couple display light into or out of substrate 420.

The exit pupil is replicated by output couplers 440 to form an aggregated exit pupil or an eyebox, where different fields of view (e.g., different pixels on image source 412) may be associated with different respective propagation directions towards the eyebox, and light from a same field of view (e.g., a same pixel on image source 412) may have a same propagation direction for the different individual exit pupils. Thus, a single image of image source 412 may be formed by the user's eye located anywhere in the eyebox, where light from different individual exit pupils and propagating in the same direction may be from a same pixel on image source 412 and may be focused onto a same location on the retina of the user's eye. Thus, the image of the image source is visible by the user's eye even if the user's eye moves to different locations in the eyebox.

In many waveguide-based near-eye display systems, in order to expand the eyebox of the waveguide-based near-eye display in two dimensions, two or more output gratings may be used to expand the display light in two dimensions or along two axes (which may be referred to as dual-axis pupil expansion). The two gratings may have different grating parameters, such that one grating may be used to replicate the exit pupil in one direction and the other grating may be used to replicate the exit pupil in another direction.

Figure 5B:
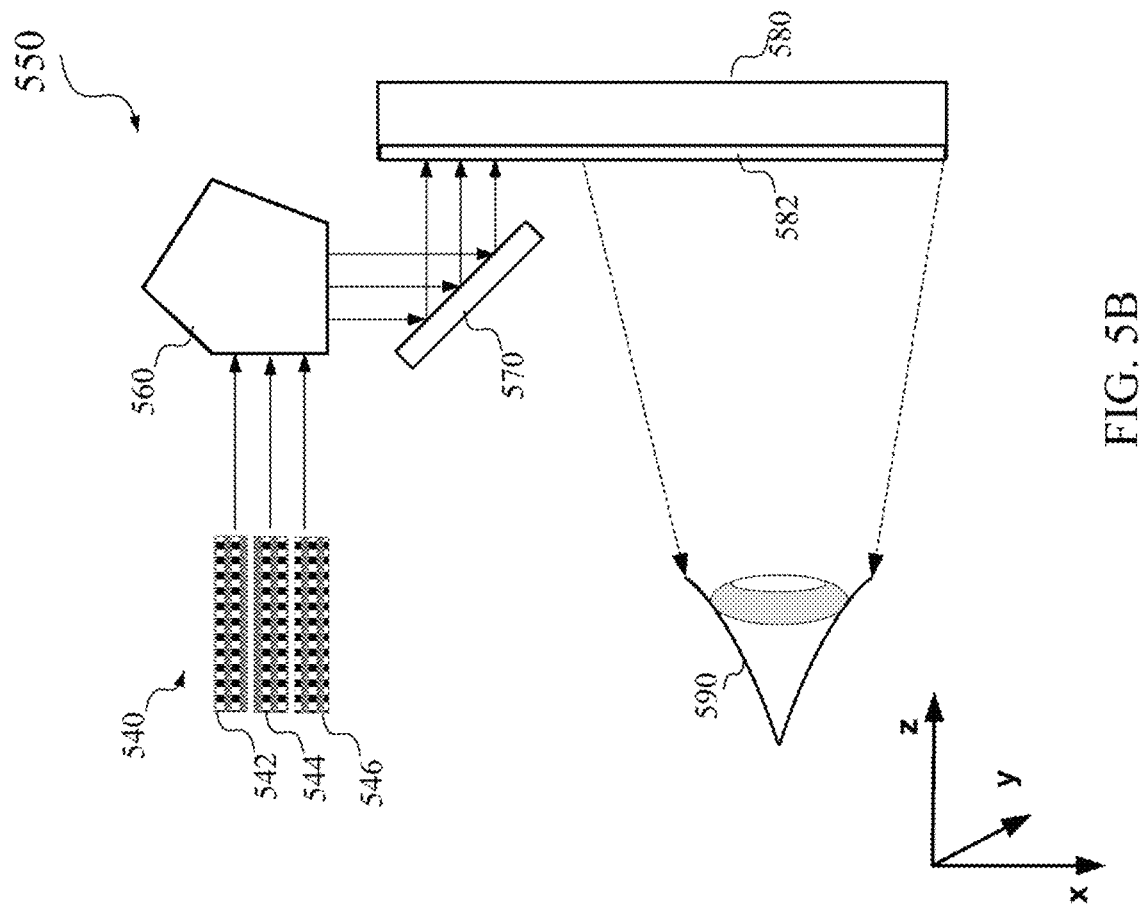
FIG. 5B illustrates an example of a near-eye display device including a waveguide display according to certain embodiments.
Figure 5A:
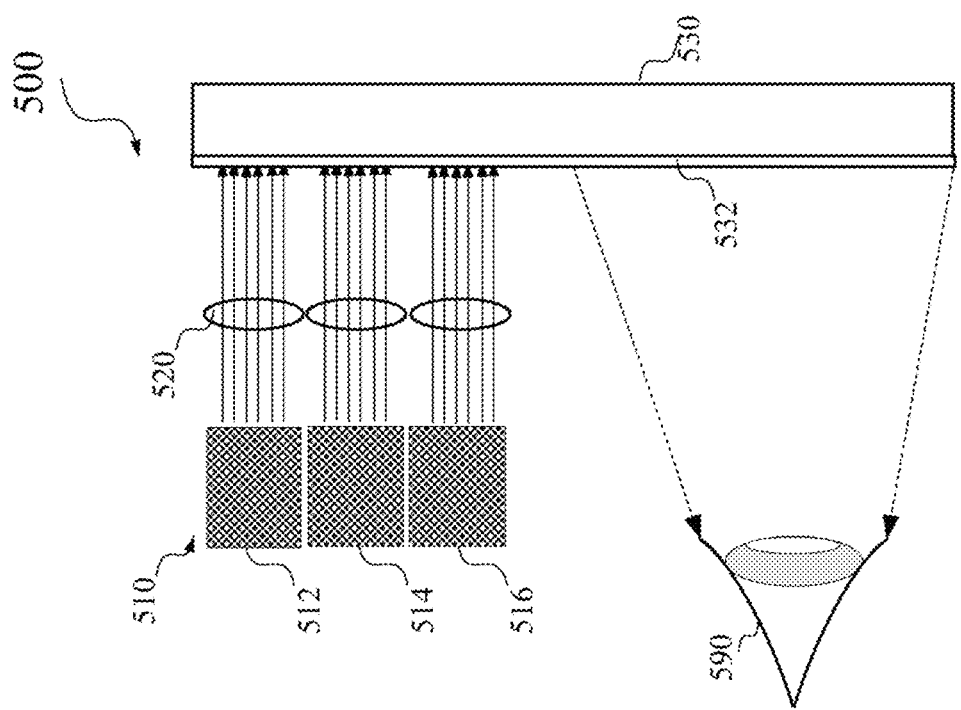
FIG. 5A illustrates an example of a near-eye display device including a waveguide display according to certain embodiments.

FIG. 5A illustrates an example of a near-eye display (NED) device 500 including a waveguide display 530 according to certain embodiments. NED device 500 may be an example of near-eye display 120, augmented reality system 400, or another type of display device. NED device 500 may include a light source 510, projection optics 520, and waveguide display 530. Light source 510 may include multiple panels of light emitters for different colors, such as a panel of red light emitters 512, a panel of green light emitters 514, and a panel of blue light emitters 516. The red light emitters 512 are organized into an array; the green light emitters 514 are organized into an array; and the blue light emitters 516 are organized into an array. The dimensions and pitches of light emitters in light source 510 may be small. For example, each light emitter may have a diameter less than 2 μm (e.g., about 1.2 μm) and the pitch may be less than 2 μm (e.g., about 1.5 μm). As such, the number of light emitters in each red light emitters 512, green light emitters 514, and blue light emitters 516 can be equal to or greater than the number of pixels in a display image, such as 960×720, 1280×720, 1440×1080, 1920×1080, 2160×1080, or 2560×1080 pixels. Thus, a display image may be generated simultaneously by light source 510. A scanning element may not be used in NED device 500.

Before reaching waveguide display 530, the light emitted by light source 510 may be conditioned by projection optics 520, which may include a lens array. Projection optics 520 may collimate or focus the light emitted by light source 510 to waveguide display 530, which may include a coupler 532 for coupling the light emitted by light source 510 into waveguide display 530. The light coupled into waveguide display 530 may propagate within waveguide display 530 through, for example, total internal reflection as described above with respect to FIG. 4. Coupler 532 may also couple portions of the light propagating within waveguide display 530 out of waveguide display 530 and towards user's eye 590.

FIG. 5B illustrates an example of a near-eye display (NED) device 550 including a waveguide display 580 according to certain embodiments. In some embodiments, NED device 550 may use a scanning mirror 570 to project light from a light source 540 to an image field where a user's eye 590 may be located. NED device 550 may be an example of near-eye display 120, augmented reality system 400, or another type of display device. Light source 540 may include one or more rows or one or more columns of light emitters of different colors, such as multiple rows of red light emitters 542, multiple rows of green light emitters 544, and multiple rows of blue light emitters 546. For example, red light emitters 542, green light emitters 544, and blue light emitters 546 may each include N rows, each row including, for example, 2560 light emitters (pixels). The red light emitters 542 are organized into an array; the green light emitters 544 are organized into an array; and the blue light emitters 546 are organized into an array. In some embodiments, light source 540 may include a single line of light emitters for each color. In some embodiments, light source 540 may include multiple columns of light emitters for each of red, green, and blue colors, where each column may include, for example, 1080 light emitters. In some embodiments, the dimensions and/or pitches of the light emitters in light source 540 may be relatively large (e.g., about 3-5 μm) and thus light source 540 may not include sufficient light emitters for simultaneously generating a full display image. For example, the number of light emitters for a single color may be fewer than the number of pixels (e.g., 2560×1080 pixels) in a display image. The light emitted by light source 540 may be a set of collimated or diverging beams of light.

Before reaching scanning mirror 570, the light emitted by light source 540 may be conditioned by various optical devices, such as collimating lenses or a freeform optical element 560. Freeform optical element 560 may include, for example, a multi-facets prism or another light folding element that may direct the light emitted by light source 540 towards scanning mirror 570, such as changing the propagation direction of the light emitted by light source 540 by, for example, about 90° or larger. In some embodiments, freeform optical element 560 may be rotatable to scan the light. Scanning mirror 570 and/or freeform optical element 560 may reflect and project the light emitted by light source 540 to waveguide display 580, which may include a coupler 582 for coupling the light emitted by light source 540 into waveguide display 580. The light coupled into waveguide display 580 may propagate within waveguide display 580 through, for example, total internal reflection as described above with respect to FIG. 4. Coupler 582 may also couple portions of the light propagating within waveguide display 580 out of waveguide display 580 and towards user's eye 590.

Scanning mirror 570 may include a microelectromechanical system (MEMS) mirror or any other suitable mirrors. Scanning mirror 570 may rotate to scan in one or two dimensions. As scanning mirror 570 rotates, the light emitted by light source 540 may be directed to a different areas of waveguide display 580 such that a full display image may be projected onto waveguide display 580 and directed to user's eye 590 by waveguide display 580 in each scanning cycle. For example, in embodiments where light source 540 includes light emitters for all pixels in one or more rows or columns, scanning mirror 570 may be rotated in the column or row direction (e.g., x or y direction) to scan an image. In embodiments where light source 540 includes light emitters for some but not all pixels in one or more rows or columns, scanning mirror 570 may be rotated in both the row and column directions (e.g., both x and y directions) to project a display image (e.g., using a raster-type scanning pattern).

NED device 550 may operate in predefined display periods. A display period (e.g., display cycle) may refer to a duration of time in which a full image is scanned or projected. For example, a display period may be a reciprocal of the desired frame rate. In NED device 550 that includes scanning mirror 570, the display period may also be referred to as a scanning period or scanning cycle. The light generation by light source 540 may be synchronized with the rotation of scanning mirror 570. For example, each scanning cycle may include multiple scanning steps, where light source 540 may generate a different light pattern in each respective scanning step.

In each scanning cycle, as scanning mirror 570 rotates, a display image may be projected onto waveguide display 580 and user's eye 590. The actual color value and light intensity (e.g., brightness) of a given pixel location of the display image may be an average of the light beams of the three colors (e.g., red, green, and blue) illuminating the pixel location during the scanning period. After completing a scanning period, scanning mirror 570 may revert back to the initial position to project light for the first few rows of the next display image or may rotate in a reverse direction or scan pattern to project light for the next display image, where a new set of driving signals may be fed to light source 540. The same process may be repeated as scanning mirror 570 rotates in each scanning cycle. As such, different images may be projected to user's eye 590 in different scanning cycles.

As described above, the overall efficiency of a waveguide-based display system may be a product of the efficiencies of individual components in the display system and the coupling efficiencies between the individual components. For example, the overall efficiency $\eta_{tot}$ of near-eye display device 500 may be $\eta_{tot} = \eta_{EQE} \times \eta_{in} \times \eta_{out}$, where $\eta_{EQE}$ is the external quantum efficiency of light source 510, $\eta_{in}$ is the in-coupling efficiency of display light from light source 510 into waveguide display 530, and $\eta_{out}$ is the out-coupling efficiency of the display light from waveguide display 530 towards the user's eye. The overall efficiency $\eta_{tot}$ of near-eye display device 500 can be improved by improving the external quantum efficiency of light source 510 and the coupling efficiency of coupler 532.

In semiconductor LEDs, photons may be generated at a certain internal quantum efficiency through the recombination of electrons and holes within an active region (e.g., one or more semiconductor layers), where the internal quantum efficiency may be the proportion of the radiative electron-hole recombination in the active region that emits photons. The generated light may then be extracted from the LEDs in a particular direction or within a particular solid angle. The ratio between the number of emitted photons extracted from an LED and the number of electrons passing through the LED may be referred to as the external quantum efficiency, which describes how efficiently the LED converts injected electrons to photons that are extracted from the device.

The coupling efficiency from a light source to a waveguide using, for example, a grating coupler, is generally polarization dependent due to, for example, characteristics of the grating coupler and/or the waveguide. For example, light of a certain polarization state (e.g., a certain linear polarization direction) may be coupled into the waveguide with a higher coupling efficiency, while light of a different polarization state (e.g., a orthogonal linear polarization direction) may be coupled into the waveguide with a lower coupling efficiency. Thus, the coupling efficiency can be improved by generating polarized light that can be coupled into a waveguide with a high coupling efficiency. For example, for micro-LEDs fabricated on III-nitride materials (e.g., GaN) with certain semi-polar orientations (between the polar c-plane and nonpolar a- or m-plane), the (peak) quantum efficiency of the micro-LEDs may not drop with decreasing micro-LED size (e.g., to achieve a higher display resolution), the current density at the peak quantum efficiency may not increase with decreasing micro-LED size, and thus the overall efficiency can be higher. In addition, in LEDs fabricated on GaN layers having semi-polar (or non-polar) orientations, the GaN layers may naturally undergo anisotropic strain and thus can emit light with a higher degree of linear polarization. Using micro-LEDs that generate light with a higher degree of linear polarization, an in-coupling efficiency can be improved by more than 50% compared with completely unpolarized light (e.g., light with a degree of linear polarization about 0%). Therefore, for micro-LEDs fabricated on III-nitride materials with certain semi-polar orientations, both a high external quantum efficiency $\eta_{EQE}$ and a high degree of linear polarization in the emitted light (and thus a higher coupling efficiency $\eta_{in}$ to a waveguide) can be achieved. As such, the overall efficiency of the near-eye display system that includes the micro-LED or waveguide can be improved significantly. Other light sources, such as SLEDs, resonant cavity LEDs (RCLEDs), vertical cavity surface emitting lasers (VCSELs), vertical external cavity surface emitting lasers (VECSELs), and the like, may also be used as the light source in a waveguide display, where the light emitted by these light sources may be polarized to a desired polarization state using various polarizers before being coupled into the waveguide.

In addition, to improve the coupling efficiency, the grating coupler may be made polarization sensitive, where the polarization state of the incident light for achieving the maximum diffraction efficiency may match the polarization state of the light generated by the light source and/or the polarization state of the light that can be more efficiently guided by the waveguide and coupled to user's eyes. In some embodiments, polarization-dependent gratings may be used to couple light from different fields of view into the waveguide. For example, light from a first field of view (e.g., left half of the full FOV) may be polarized to TE mode and coupled into the waveguide using a grating having a high diffraction efficiency for TE mode light and a low diffraction efficiency for TM mode light, while light from a second field of view (e.g., right half of the full FOV) may be polarized to TM mode and coupled into the waveguide using a grating having a high diffraction efficiency for TM mode light and a low diffraction efficiency for TE mode light. In some embodiments, the grating couplers may also be used to diffract, for example, near infrared light for eye tracking.

In some applications, it may be desirable that the output couplers of the waveguide display are polarization dependent such that they may couple light of certain polarization states out of the waveguide towards the user's eye. For example, in some near-eye display systems, polarization-dependent lenses (e.g., including polymeric liquid crystals or Pancharatnam-Berry phase lenses) may be used to change the focal length and thus the location of the image plane for light of different polarization states in order to overcome the vergence-accommodation conflict.

As described above, the input and output grating couplers described above can be volume holographic gratings or surface relief gratings, which may have very different Klein-Cook parameter Q:

$$Q = \frac{2\pi\lambda d}{n\Lambda^2},$$

where d is the thickness of the grating, $\lambda$ is the wavelength of the incident light in free space, $\Lambda$ is the grating period, and n is the refractive index of the recording medium. The Klein-Cook parameter Q may divide light diffraction by gratings into three regimes. When a grating is characterized by Q<<1, light diffraction by the grating may be referred to as Raman-Nath diffraction, where multiple diffraction orders may occur for normal and/or oblique incident light. When a grating is characterized by Q>>1 (e.g., Q≥0), light diffraction by the grating may be referred to as Bragg diffraction, where generally only the zeroth and the ±1 diffraction orders may occur for light incident on the grating at an angle satisfying the Bragg condition. When a grating is characterized by Q≈1, the diffraction by the grating may be between the Raman-Nath diffraction and the Bragg diffraction. To meet Bragg conditions, the thickness d of the grating may be higher than certain values to occupy a volume (rather than at a surface) of a medium, and thus may be referred to as a volume Bragg grating. VBGs may generally have relatively small refractive index modulations (e.g., Δn≤0.05) and high spectral and angular selectivity, while surface relief gratings may generally have large refractive index modulations (e.g., Δn≥0.5) and wide spectral and angular bandwidths.

Figure 6A:
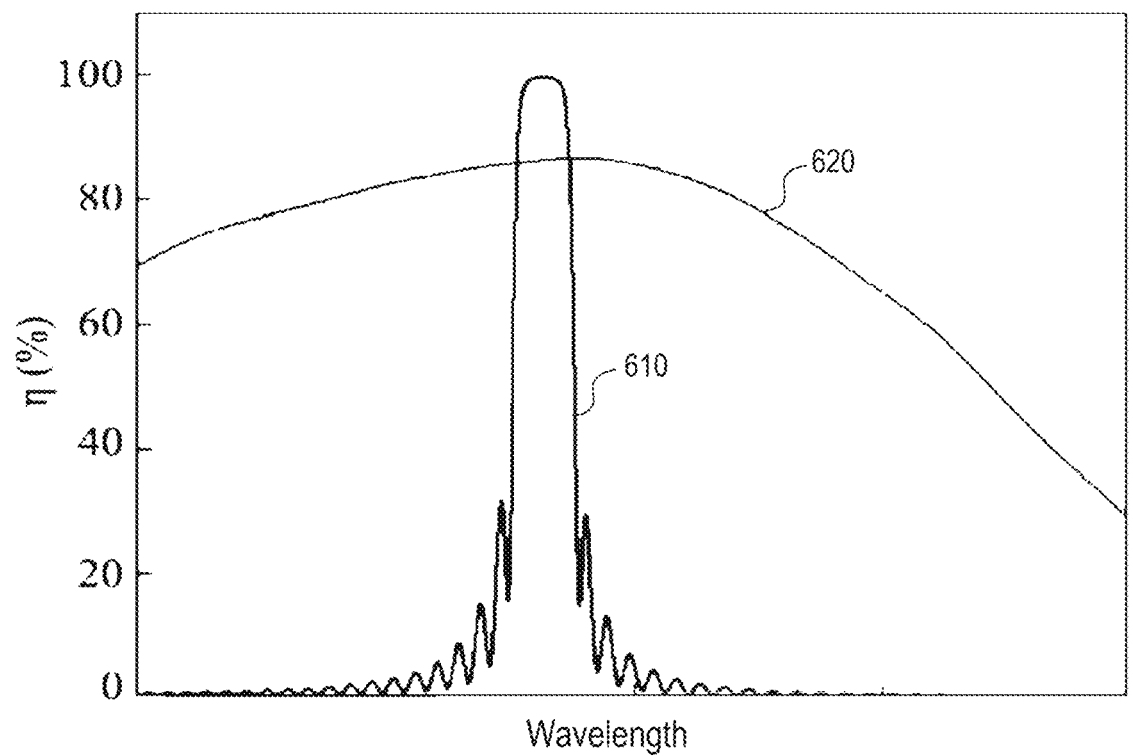
FIG. 6A illustrates the spectral bandwidth of an example of a reflective volume Bragg grating (VBG) and the spectral bandwidth of an example of a transmissive surface relief grating (SRG).

FIG. 6A illustrates the spectral bandwidth of an example of a volume Bragg grating (e.g., a reflective VBG) and the spectral bandwidth of an example of a surface relief grating (e.g., a transmissive SRG). The horizontal axis represents the wavelength of the incident visible light and the vertical axis corresponds to the diffraction efficiency. As shown by a curve 610, the diffraction efficiency of the reflective VBG is high in a narrow wavelength range, such as green light. In contrast, the diffraction efficiency of the transmissive SRG may be high in a very wide wavelength range, such as from blue to red light, as shown by a curve 620.

Figure 6B:
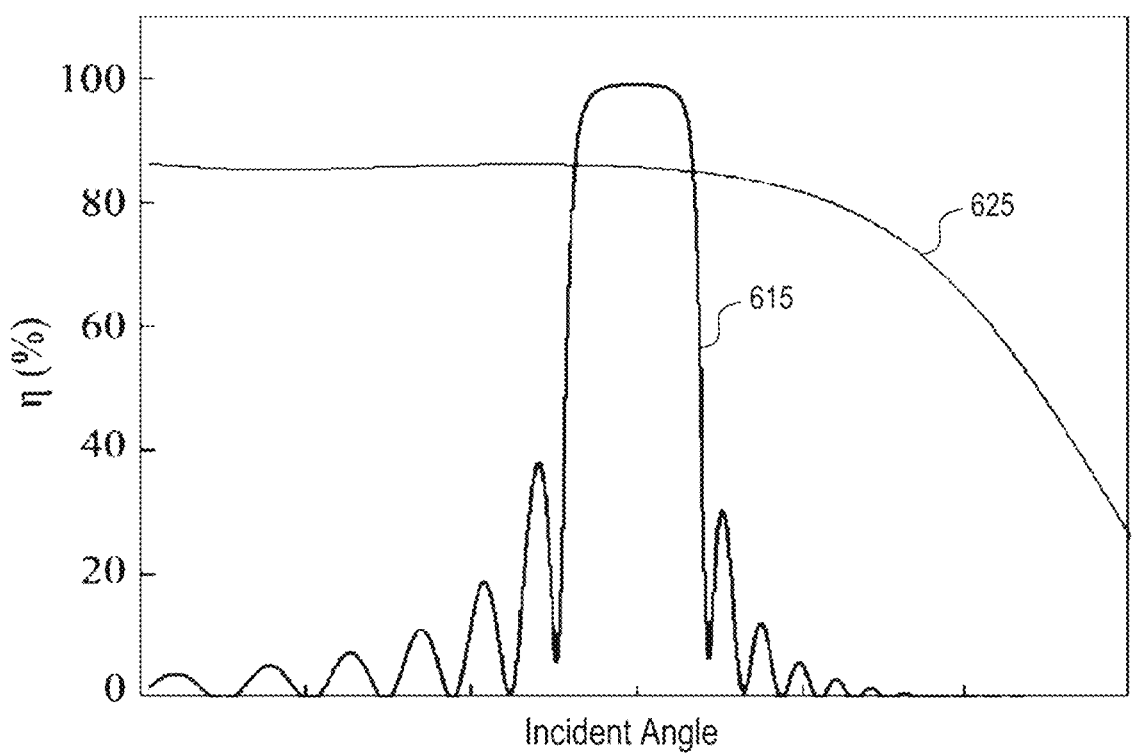
FIG. 6B illustrates the angular bandwidth of an example of a reflective VBG and the angular bandwidth of an example of a transmissive SRG.

FIG. 6B illustrates the angular bandwidth of an example of a volume Bragg grating (e.g., a reflective VBG) and the angular bandwidth of an example of a surface relief grating (e.g., a transmissive SRG). The horizontal axis represents the incident angle of the visible light incident on the grating, and the vertical axis corresponds to the diffraction efficiency. As shown by a curve 615, the diffraction efficiency of the reflective VBG is high for light incident on the grating from a narrow angular range, such as about ±2.5° from the perfect Bragg condition. In contrast, the diffraction efficiency of the transmissive SRG is high in a very wide angular range, such as greater than about ±10° or wider, as shown by a curve 625.

The surface relief gratings, such as couplers 430, 440, 532, and 582, may be made in some dielectric, polymer, or semiconductor materials, such as silicon, silicon dioxide, some polymers, or the like. Some of these materials may be optically isotropic materials, where the refractive index may not depend on the light propagation direction and/or the light vibration direction (e.g., polarization direction). Gratings made using isotropic materials may exhibit some degrees of polarization dependency, but it may generally be difficult to make gratings with high polarization contrast ratio using such materials.

According to certain embodiments, grating couplers, such as couplers 430, 440, 532, and 582, may be made using anisotropic materials to be polarization sensitive. In one example, the surface relief grating may be made using a birefringent material, and the grooves of the surface relief grating may or may not be filled with an index matching material (e.g., a polymer) having a refractive index approximately equal to one of the refractive indices of the anisotropic material. In some embodiments, the surface relief grating may be made in an isotropic material and may be overcoated with a birefringent material that fills the grating grooves. Light may incident on the grating in a direction that is not parallel to the optic axis of the anisotropic material in the grating, and thus the refractive index for the light propagating in the anisotropic material in the grating may depend on the light propagation direction and the light vibration direction to cause different diffraction performance for light of different polarization directions.

Figure 7C:
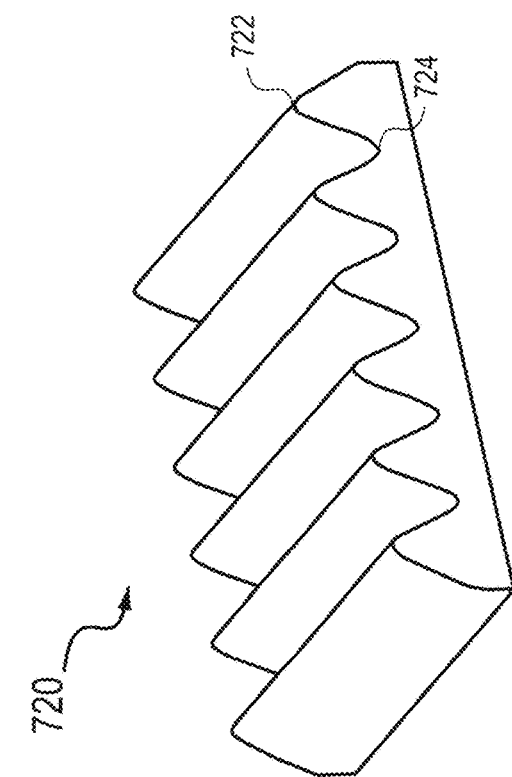
FIGS. 7A-7D illustrate examples of one-dimensional surface relief gratings with different cross sections according to certain embodiments.
Figure 7D:
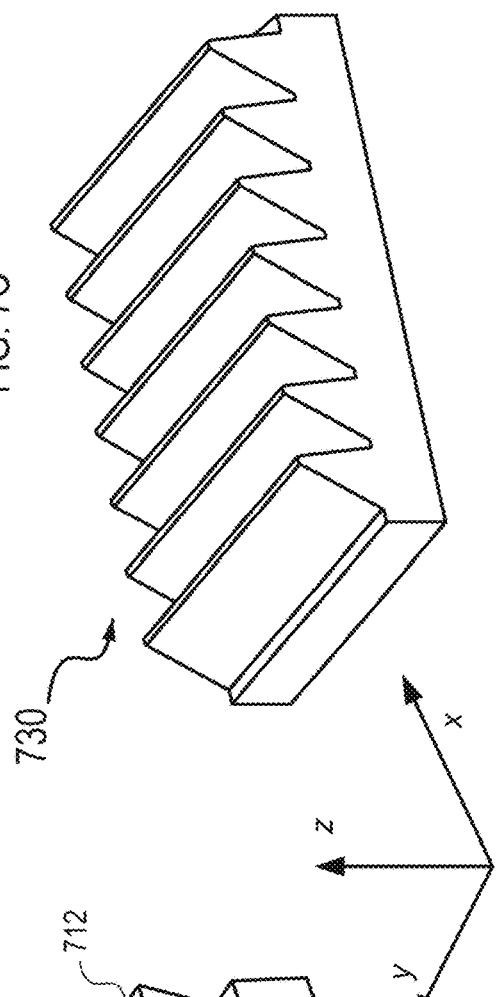
Figure 7A:
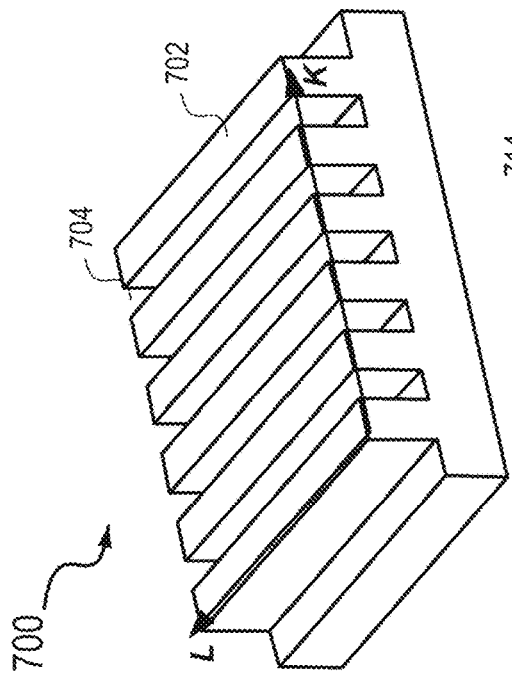

FIGS. 7A-7D illustrate examples of surface relief gratings with different cross sections according to certain embodiments. The examples of surface relief gratings shown in FIGS. 7A-7D may be fabricated using birefringent materials. FIG. 7A illustrates a surface relief grating 700 that includes a one-dimensional rectangular wave grating, which may also be referred to as a binary grating due to the two discrete heights or optical phases. Surface relief grating 700 may include a plurality of grating periods each including a ridge 702 and a groove 704. Ridge 702 and groove 704 may have a rectangle shape in a cross-section. Ridge 702 and groove 704 may have the same width or different widths, and thus surface relief grating 700 may have a duty cycle less than, equal to, or greater than 50%. Surface relief grating 700 may be characterized by a grating vector K, a lateral extension direction L of ridges 702, a depth, and the like. In some embodiments, surface relief grating 700 may include an overcoat layer (not shown) that may fill grooves 704. The overcoat layer may include a material having a suitable refractive index.

Figure 7B:
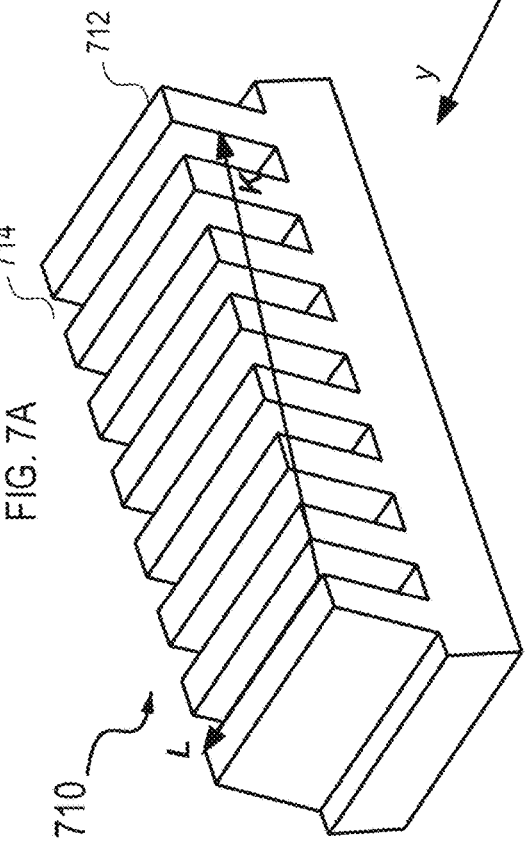

FIG. 7B illustrates a surface relief grating 710 that includes a one-dimensional slanted surface relief grating. The slanted surface relief grating includes a plurality of grating periods each including a ridge 712 and a groove 714. Ridge 712 and groove 714 may have a parallelogram shape in the cross-section, where the leading edge and the trailing edge of ridge 712 may be approximately parallel to each other. Surface relief grating 710 may also be characterized by a grating vector K, a lateral extension direction L of ridges 712, a depth, and the like. Ridge 712 and groove 714 may have the same width or different widths in the x direction, and thus surface relief grating 710 may have a duty cycle less than, equal to, or greater than 50%. In some embodiments, surface relief grating 710 may include an overcoat layer (not shown) that may fill grooves 714. The overcoat layer may include a material having a suitable refractive index.

FIG. 7C illustrates a surface relief grating 720 that includes a one-dimensional sinusoidal grating. The height or optical phase of surface relief grating 720 may vary in the x direction according to a sinusoidal function. Each period of surface relief grating 720 may include a peak and a valley. In some embodiments, surface relief grating 720 may include an overcoat layer (not shown) that may fill valleys 724. The overcoat layer may include a material having a suitable refractive index.

FIG. 7D illustrates a surface relief grating 730 that includes a one-dimensional blazed grating. Each period in surface relief grating 730 may include ridges having a triangular or sawtooth-shaped cross-section. The triangular or sawtooth-shaped cross-section may have a blaze angle with respect to the substrate of the grating (e.g., the x-axis), such that the diffraction angle of the light beam diffracted by the grating and the reflection direction of the light beam reflected by the blazed surface may be in the same direction. In some embodiments, surface relief grating 730 may include an overcoat layer (not shown) on the triangular or sawtooth-shaped ridges. The overcoat layer may include a material having a suitable refractive index.

Although FIGS. 7A-7D illustrate some examples of surface relief gratings that are periodical in one dimension, some surface relief gratings may also be two-dimensional gratings, where the height of the grating may vary in two directions. Furthermore, some surface relief gratings may not be periodical, where the size, the shape, the duty cycle, the depth, and the like of each period may vary in one or two dimensions. For example, some surface relief gratings may be chirped gratings, where the period or pitch varies across the grating. In some surface relief gratings, the duty cycle of each period may be different in different areas of the grating. In some surface relief gratings, the depth or height of the surface relief grating may vary for different periods of the grating, where the maximum depth or height of the grating period may be different in different periods of the grating. In some surface relief gratings, any of the period size, duty cycle, slant angle, maximum depth, and the like, may vary from period to period. In some embodiments, a surface relief grating may include a reflective surface opposite to the surface where ridges and grooves may be formed.

FIGS. 8A-8D illustrate examples of two-dimensional surface relief gratings according to certain embodiments. The examples of two-dimensional surface relief gratings shown in FIGS. 8A-8D may be made in birefringent materials, or may be made in isotropic materials and then overcoated with birefringent materials. The surface relief grating may include various micro-structures, such as cylindrical pillars, cuboidal pillars, apertures, cavities, pyramids, or the like. The micro-structures may have spatially invariant or varying heights and/or angles of inclination. For example, the micro-structures may form certain photonic crystals or meta gratings.

FIG. 8A illustrates an example of a two-dimensional surface relief grating 800 that includes a 2-dimensional array of cuboidal pillars 804 on an underlying layer 802, such as a substrate or a polymer layer deposited on a substrate. FIG. 8B illustrates an example of a two-dimensional surface relief grating 810 that includes a 2-dimensional array of hexagonal apertures 814 or other shaped apertures or cavities formed in a layer 812, such as a substrate or a polymer layer deposited on a substrate. FIG. 8C illustrates an example of a two-dimensional surface relief grating 820 that includes a 2-dimensional array of cylindrical pillars 824 on an underlying layer 822, such as a substrate or a polymer layer deposited on a substrate. Cylindrical pillars 824 may have similar dimensions, such as diameters, heights, and pitches (or distances between adjacent pillars). FIG. 8D illustrates an example of a two-dimensional surface relief grating 830 that includes a 2-dimensional array of cylindrical pillars 834 on an underlying layer 832, such as a substrate or a polymer layer deposited on a substrate. Cylindrical pillars 834 may have spatially varying dimensions, such as diameters, heights, or pitches.

The surface relief gratings described above may be etched, molded, or other fabricated using various techniques. For example, the surface relief gratings may be fabricated via photoresist patterning using photolithography techniques, followed by etching (e.g., dry etching) to transfer patterns to birefringent materials or isotropic materials. The surface relief gratings may also be fabricated using nanoimprint lithography through a pre-made mold, followed by curing, cooling, and mold delamination.

The anisotropic materials used in the substrate relief gratings may include some crystals, polymers, polymerized liquid crystals, or the like. For example, some crystals or thin films may have different lattice structures (or crystalline phase, e.g., cubic, tetragonal, hexagonal, rhombohedral, etc.) and different atom arrangements along different directions, and thus may have different refractive indices for light beams with different propagation directions and/or light vibration directions. As such, gratings made using optically anisotropic materials may have different diffraction performance for light of different incident directions and/or different polarization directions. Examples of birefringent materials used for making the polarization sensitive gratings disclosed herein may include birefringent polymers (e.g., certain PEN or PET materials), birefringent ceramics (e.g., calcite and other single crystal inorganics), aligned liquid crystal polymer (LCP) including polymer/LCP mixtures, aligned epitaxial single crystal organic molecules (e.g., anthracene), and the like.

Anisotropic minerals may include, for example, uniaxial birefringent materials or biaxial birefringent materials. A uniaxial birefringent material may include one optic axis, while a biaxial birefringent material may have two optic axes. When a light beam enters an anisotropic material in the direction of an optic axis, its speed in the anisotropic material may not depend on the polarization direction of the light beam. Thus, light with different polarization directions may pass through the anisotropic material at a single velocity in the optic axis direction. When a light beam enters an anisotropic material in a direction different from an optic axis direction, it may be subject to birefringence and may be refracted into two rays. The two rays may have orthogonal vibration or polarization directions and may travel at different velocities. One of the two rays (referred to as ordinary ray or o-ray) may obey the law of normal refraction (e.g., Snell's law), and may travel with the same velocity (e.g., $c/n_o$) in every direction through the anisotropic material. The other ray (referred to as extraordinary ray or e-ray) may travel with a velocity that may depend on the propagation direction of the light beam within the crystal. When a light beam enters the anisotropic material in a direction perpendicular to an optical axis, it may be separated into the ordinary and extraordinary rays that may take the same path but may have different propagation velocities and thus an optical phase shift between them after passing through the anisotropic material.

Figure 9B:
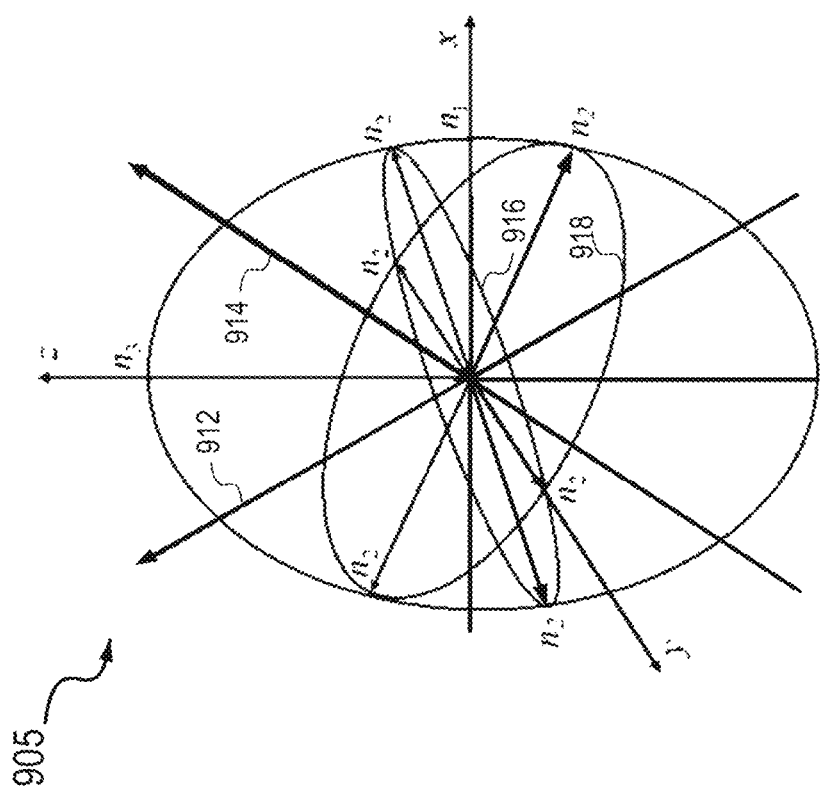
FIG. 9B illustrates an example of an indicatrix of a biaxial birefringent material.
Figure 9A:
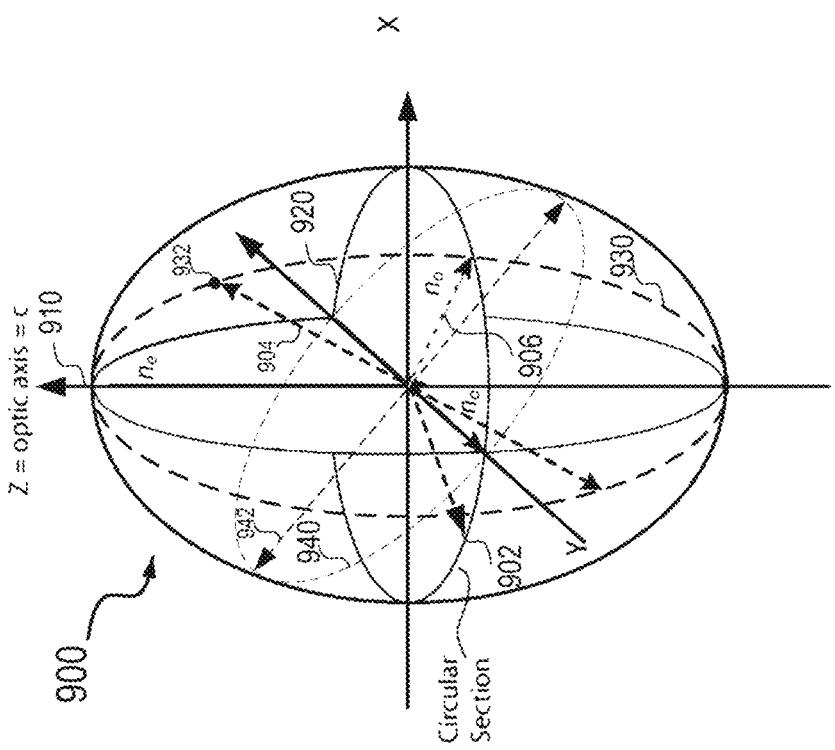
FIG. 9A illustrates an example of an indicatrix of a uniaxial birefringent material.

FIG. 9A illustrates an example of an indicatrix 900 of a uniaxial birefringent material. Indicatrix 900 shows the refractive indices for light propagating in the uniaxial birefringent material and with different vibration directions. The uniaxial birefringent material may have one optical axis 910. Thus, the uniaxial birefringent material may have one refractive index ($n_e$) for light polarized along the optic axis (e.g., e-ray) and another refractive index ($n_o$) for light polarized in any directions perpendicular to optic axis 910 (e.g., o-ray). In indicatrix 900, each point on the ellipsoid is associated with a vector from the center of the ellipsoid to the point, where the length of the vector is proportional to the refractive index for light vibrating in the direction of the vector.

As shown in indicatrix 900 of the uniaxial birefringent material, the c-axis of the uniaxial birefringent material is also the optic axis. The e-ray vibrating in the direction of optic axis 910 may be subject to refractive index $n_e$ in the uniaxial birefringent material. Light vibrating in directions perpendicular to the c-axis (e.g., parallel to the x-y plane) may be the o-ray and may be subject to refractive index $n_o$ in the uniaxial birefringent material. Thus, the vectors for light vibrating in directions perpendicular to the c-axis may form a circle 920 with a radius $n_o$, which may be referred to as the circular section of a uniaxial indicatrix.

Light traveling along the c-axis may have a vibration direction perpendicular to the c-axis or parallel to the x-y plane, and thus may be subject to refractive index $n_o$. Light traveling in directions perpendicular to optic axis 910 or parallel to the x-y plane may have a vibration direction along optic axis 910, a vibration direction perpendicular to optic axis 910, or a vibration direction that may include a component along optic axis 910 and a component perpendicular to optic axis 910. Thus, light propagating in a direction perpendicular to optic axis 910, such as in a direction 902, may vibrate in a direction perpendicular to direction 902, such as a direction 904, and may be split into two rays that vibrate in directions perpendicular to each other. One of the two rays (e.g., the e-ray) vibrates in a direction parallel to optic axis 910 and thus may be subject to refractive index $n_e$, and the other ray (e.g., the o-ray) may vibrate in a direction 906 perpendicular to optic axis 910 and thus may be subject to refractive index $n_o$. Thus, the light propagating in direction 902 may have a refractive index shown by a point 932 on an ellipse 930 (referred to as a principal section) that would cut indicatrix 900 vertically. Light propagating in a direction that is oblique to optic axis 910 may vibrate in a direction parallel to a random section (e.g., an ellipse 940) of indicatrix 900 and may also be split into two rays, one vibrating in a direction parallel to the random section and perpendicular to optic axis 910 (e.g., in the y direction and thus subject to refractive index $n_o$) and one vibrating in another direction (e.g., a direction 942) parallel to the random section.

FIG. 9B illustrates an example of an indicatrix 905 for a biaxial birefringent material. Indicatrix 905 shows refractive indices for light propagating in the biaxial birefringent material and having different vibration directions. Each point on the surface of indicatrix 905 is associated with a vector from the center of indicatrix 905 to the point, where the length of the vector is proportional to the refractive index for light vibrating in the direction of the vector. Indicatrix 905 may include three principal sections: the x-z, y-z, and x-y planes. The x-y section may be an ellipse with axes $n_1$ and $n_2$, the x-z section may be an ellipse with axes $n_1$ and $n_3$, and the y-z section may be an ellipse with axes $n_2$ and $n_3$. Indicatrix 905 may have two circular sections 916 and 918 with a radius $n_2$. Other sections through indicatrix 905 may be ellipses.

The biaxial birefringent material may include two optic axes 912 and 914. Optic axis 912 may be perpendicular to circular section 916, and thus light propagating along optic axis 912 may vibrate in a direction parallel to circular section 916 and may be subject to a same refractive index $n_2$. Similarly, optic axis 914 may be perpendicular to circular section 918, and thus light propagating along optic axis 914 may vibrate in a direction parallel to circular section 918 and may be subject to a same refractive index $n_2$.

FIG. 10A illustrates diffraction of p-polarized wave by an example of a grating 1000 including a uniaxial birefringent material according to certain embodiments. As described above, the uniaxial birefringent material may include, for example, birefringent polymers (e.g., certain PEN or PET materials), birefringent ceramics, aligned liquid crystal polymer (LCP) including polymer/LCP mixtures, aligned epitaxial single crystal organic molecules, and the like. The uniaxial birefringent material may have a birefringence greater than about 0.05-0.1, greater than about 0.15, greater than about 0.2, or greater than about 0.5. In one example shown in FIG. 10A, the uniaxial birefringent material may include a uniaxial birefringent polymer, such as certain PEN or PET polymers. Grating 1000 may be a one-dimensional surface relief grating including a plurality of ridges 1010 arranged along the y direction, where each ridge 1010 may extend along the x direction. The pitch of grating 1000 may be greater than the wavelength of the incident light in grating 1000. Grating 1000 may be coated with an overcoat layer 1020 that may include an optically isotropic material, such that the grooves of grating 1000 may be filled with the optically isotropic material. The optically isotropic material may include, for example, an isotropic polymer.

In the example shown in FIG. 10A, the uniaxial birefringent polymer in grating 1000 may have an optical axis 1030 in the x-y plane, such as in the y direction. Thus, the p-polarized light propagating in the uniaxial birefringent polymer in a direction perpendicular to optic axis 1030 may vibrate in the y direction (e.g., along optic axis 1030) and thus may be subject to a first refractive index, such as $n_e$ (when optic axis 1030 is in the y direction) or between $n_o$ and $n_e$ of the uniaxial birefringent polymer (when optic axis 1030 is not in the y direction). As such, the p-polarized light propagating in the z direction may experience different refractive indices in the grating region, such as the first refractive index in the grating ridges and about 1.0 in the grating grooves. When overcoat layer 1020 is coated on grating 1000 and has a refractive index different from the first refractive index, the p-polarized light incident on grating 1000 may be subject to the same refractive index in the x direction but different refractive indices in the y direction, and thus may also experience different refractive indices in the grating region. For example, the p-polarized light may experience the first refractive index in the grating ridges and a different refractive index in the grating grooves. Therefore, with or without overcoat layer 1020, the p-polarized light may experience refractive indices according to a rectangular wave refractive index profile in the grating region (where the refractive index difference may be higher without overcoat layer 1020), and thus may be diffracted by grating 1000 into, for example, $-1^{st}$, 0th (undiffracted or refracted), or $+1^{st}$ orders in different directions with respect to the surface normal direction of grating 1000 as shown in FIG. 10A.

FIG. 10B illustrates diffraction of s-polarized wave by grating 1000 including the uniaxial birefringent material according to certain embodiments. As described above with respect to FIG. 10A, the uniaxial birefringent polymer in grating 1000 may have an optical axis 1030 in the x-y plane, such as in the y direction. Thus, s-polarized light propagating in the uniaxial birefringent polymer in a direction perpendicular to optic axis 1030 may vibrate in the x direction (e.g., perpendicular to optic axis 1030) and thus may be subject to a second refractive index, such as $n_o$ (when optic axis 1030 is in the y direction) or between $n_o$ and $n_e$ of the uniaxial birefringent polymer (when optic axis 1030 is not in the y direction). As such, without overcoat layer 1020 on grating 1000, s-polarized light may experience different refractive indices in the grating region, such as the first refractive index in the grating ridges and about 1.0 in the grating grooves. When overcoat layer 1020 is coated on grating 1000 and has a refractive index close to the second refractive index, the s-polarized light incident on grating 1000 may be subject to the same or similar refractive indices in the x direction and the same or similar refractive indices in the y direction in the grating ridges and grooves, and thus may be transmitted through grating 1000 and may not be diffracted by grating 1000 as shown in FIG. 10B. In this way, grating 1000 may selectively diffract p-polarized light and transmit s-polarized light.

FIG. 10C illustrates diffraction of s-polarized wave by an example of a grating 1005 including a uniaxial birefringent material according to certain embodiments. As described above, the uniaxial birefringent material may include, for example, birefringent polymers, birefringent ceramics, aligned liquid crystal polymer (LCP) including polymer/LCP mixtures, aligned epitaxial single crystal organic molecules, and the like. The uniaxial birefringent material may have a birefringence greater than about 0.05-0.1, greater than about 0.15, greater than about 0.2, or greater than about 0.5. In the embodiment shown in FIG. 10C, the uniaxial birefringent material may include a uniaxial birefringent polymer, such as certain PEN or PET polymers. Grating 1005 may be a one-dimensional surface relief grating including a plurality of ridges 1040 arranged along the y direction, where each ridge 1040 may extend along the x direction, as in grating 1000. The pitch of grating 1005 may be greater than the wavelength of the incident light in grating 1005. Grating 1005 may also be coated with an overcoat layer 1050 that may include an optically isotropic material, such that the grooves of grating 1005 may be filled with the optically isotropic material. The optically isotropic material may include, for example, an isotropic polymer.

Unlike in grating 1000, the uniaxial birefringent polymer in grating 1005 shown in FIG. 10C may have an optical axis 1060 in, for example, approximately the x direction in the x-y plane. Thus, s-polarized light propagating in the uniaxial birefringent polymer in a direction perpendicular to optic axis 1060 may vibrate in the x direction (e.g., along optic axis 1060) and thus may be subject to a first refractive index, such as $n_e$ (when optic axis 1060 is in the x direction) or between $n_o$ and $n_e$ of the uniaxial birefringent polymer (when optic axis 1060 is not in the x direction). As such, when overcoat layer 1050 has a refractive index different from the first refractive index, the s-polarized light incident on grating 1005 may be subject to the same refractive index in the x direction but different refractive indices in the y direction, such as refractive indices according to a rectangular wave refractive index profile, and thus may be diffracted by grating 1005 into, for example, $-1$st, 0th, or $+1'$ orders in different directions with respect to the surface normal direction of grating 1005 as shown in FIG. 10C.

FIG. 10D illustrates diffraction of p-polarized wave by grating 1005 including the uniaxial birefringent material according to certain embodiments. As described above with respect to FIG. 10C, the uniaxial birefringent polymer in grating 1005 may have an optical axis 1060 in the x-y plane, such as in approximately the x direction. Thus, p-polarized light propagating in the uniaxial birefringent polymer in a direction perpendicular to optic axis 1060 may vibrate in the y direction (e.g., perpendicular to optic axis 1060) and thus may be subject to a second refractive index, such as $n_o$ (when optic axis 1060 is in the x direction) or between $n_{ow}$ and $n_e$ of the uniaxial birefringent polymer (when optic axis 1060 is not in the x direction). As such, when overcoat layer 1060 has a refractive index close to the second refractive index, the p-polarized light may be subject to a same or similar refractive indices in the x direction and a same or similar refractive indices in the y direction, and thus may be transmitted through grating 1005 and may not be diffracted by grating 1005 as shown in FIG. 10D. In this way, grating 1005 may selectively diffract s-polarized light and transmit p-polarized light.

FIG. 11A illustrates an example of a surface relief grating 1120 including a birefringent material and used as an input coupler for a waveguide display 1100 according to certain embodiments. Surface relief grating 1120 may include a plurality of ridges arranged along the x direction, where each ridge may extend along the y direction and may include a slanted ridge or a blazed surface. The pitch of surface relief grating 1120 may be greater than the wavelength of the incident light in surface relief grating 1120. Surface relief grating 1120 may be formed on a waveguide layer 1110, which may include a substrate or substrate with a birefringent material layer deposited thereon.

In the example shown in FIG. 11A, surface relief grating 1120 may be similar to grating 1000, and may be made with a uniaxial birefringent material, such as a birefringent polymer (e.g., certain PEN or PET polymers), which may have an optic axis 1112 in the x direction. Thus, as grating 1000, surface relief grating 1120 may selectively diffract p-polarized light at a certain diffraction angle, such that the diffracted light may propagate within waveguide layer 1110 through total internal reflection as described above with respect to, for example, FIG. 4. If the input light beam includes any s-polarized light, the s-polarized light may be transmitted through surface relief grating 1120 and waveguide layer 1110 with little or no diffraction. Thus, if an input light beam from a light source includes mostly p-polarized light, the light beam from the light source can be more efficiently coupled into waveguide layer 1110.

FIG. 11B illustrates examples of surface relief gratings including birefringent materials and used as couplers for a waveguide display 1105 according to certain embodiments. The surface relief gratings may include an input grating 1140 and one or more output gratings 1150 formed on a waveguide layer 1130, which may include a substrate or a substrate with a birefringent material layer deposited thereon. Output grating 1150 and input grating 1140 may be on the same side of waveguide layer 1130 or may be on opposite sides of waveguide layer 1130. Each of the surface relief gratings in input grating 1140 and output grating 1150 may include a plurality of ridges arranged along the x direction, where each ridge may extend along the y direction and may include a slanted ridge or a blazed surface. The pitch of input grating 1140 or output grating 1150 may be greater than the wavelength of the incident light in input grating 1140.

In the example shown in FIG. 11B, input grating 1140 may be similar to surface relief grating 1120, and may be made with a uniaxial birefringent material, such as a birefringent polymer (e.g., certain PEN or PET polymers), which may have an optic axis 1132 in the x direction. Thus, as surface relief grating 1120, input grating 1140 may selectively diffract p-polarized light at a certain diffraction angle, such that the diffracted light may propagate within waveguide layer 1130 through total internal reflection as described above with respect to, for example, FIG. 4. If the input light beam includes any s-polarized light, the s-polarized light may be transmitted through surface relief grating 1120 and waveguide layer 1110 with little or no diffraction. Thus, if an input light beam from a light source includes mostly p-polarized light, the light beam from the light source can be more efficiently coupled into waveguide layer 1110.

Similar to input grating 1140, output grating 1150 may be made with a uniaxial birefringent material, such as a birefringent polymer (e.g., certain PEN or PET materials), which may have an optic axis 1132 in the x direction. Thus, as input grating 1140, output grating 1150 may selectively diffract p-polarized light propagating within waveguide layer 1130 at a certain angle out of waveguide layer 1130 as described above with respect to, for example, FIG. 4. If the light propagating within waveguide layer 1130 includes any s-polarized light, the s-polarized light may continue to propagate within waveguide layer 1130 due to total internal reflection and may not be diffracted by output grating 1150. Thus, if an input light beam from a light source includes mostly p-polarized light, the light beam from the light source can be more efficiently coupled into waveguide layer 1130 by input grating 1140 and coupled out of waveguide layer 1130 at one or more locations by one or more output gratings 1150.

Even though surface relief grating 1120, input grating 1140, and output gratings 1150 are shown as transmissive grating in FIGS. 11A and 11B, any or all of surface relief grating 1120, input grating 1140, and output gratings 1150 can be a reflective grating. For example, input grating 1140 may be on the bottom surface of waveguide layer 1130, and may reflectively diffract light incident on waveguide layer 1130 from the top surface of waveguide layer 1130. Similarly, output grating 1150 may be on the top surface of waveguide layer 1130, and may reflectively diffract light incident on output grating 1150 at the top surface of waveguide layer 1130 towards the bottom surface of waveguide layer 1130 and out of waveguide layer 1130. In some embodiments, surface relief grating 1120, input grating 1140, and output gratings 1150 may include a reflective surface opposite to the surface on which the grating ridges and grooves are formed.

As described above, the input grating (e.g., input grating 1120 or 1140) may mainly diffract light of one polarization state (e.g., p-polarized light) where the diffracted light may be guided by the waveguide layer (e.g., waveguide layer 1110 or 1130), while orthogonally polarized light may mostly be transmitted by the input grating without being diffracted and thus may be transmitted through the waveguide layer. In some embodiments, a polarization selective reflective layer (not shown in FIGS. 11A and 11B) may be coated on a surface of the waveguide layer opposite to the input grating, for example, below input grating 1120 or 1140. The polarization selective reflective layer may reflect the orthogonally polarized light back to the input coupler or into the waveguide layer. In some embodiments, the polarization selective reflective layer may also include a polarization rotator (e.g., a quarter wave plate) that can rotate the light polarization state.

In some embodiments, the polarization selective reflective layer may include a second input coupler (not shown in FIGS. 11A and 11B). The second input coupler may be formed on the opposite surface (e.g., the bottom surface) of the waveguide layer with respect to the input coupler (e.g., input coupler 1120 or 1140). The second input coupler may be a reflective grating and thus may reflectively diffract the orthogonally polarized light that passes through the waveguide layer back into the waveguide layer as guided waves. Thus, the input couplers on opposite sides of the waveguide layer may be used to more efficiently couple polarized or unpolarized light into the waveguide layer, or may be used to, for example, couple light for different fields of view or in different wavelength ranges into the waveguide layer as described above.

Figures 12A, 12B, 12C:
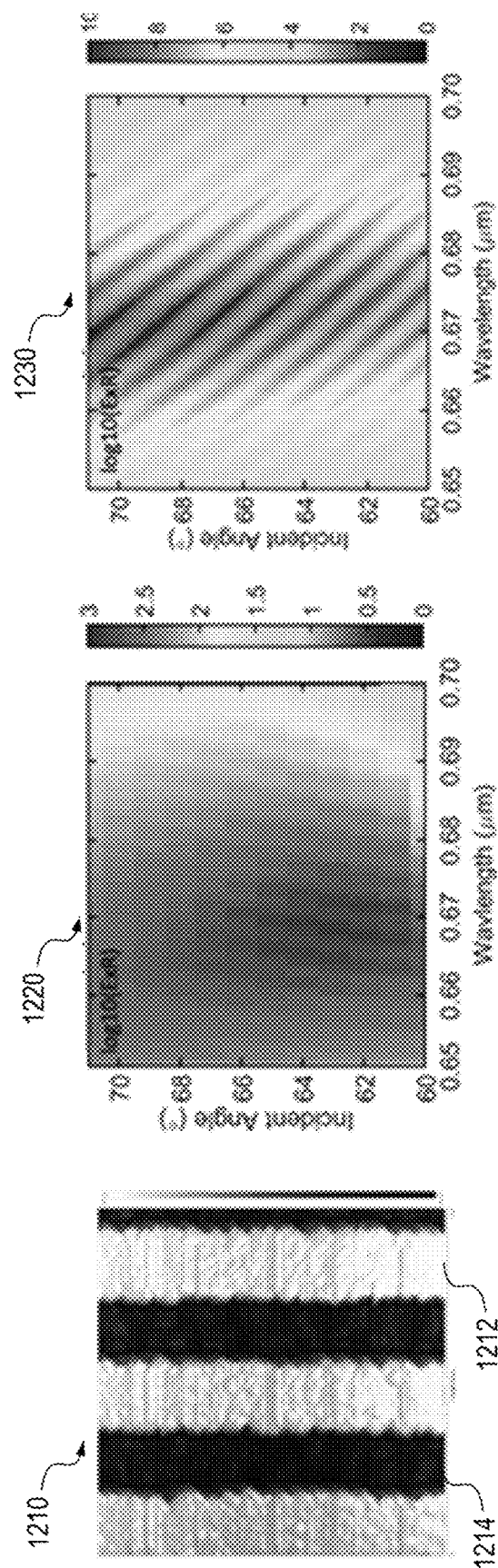
FIG. 12A is an atomic force microscopy image of an example of a surface relief grating including a birefringent polymer according to certain embodiments.
FIG. 12B shows measured polarization contrast of the example of the surface relief grating shown in FIG. 12A according to certain embodiments.
FIG. 12C shows measured polarization contrast of the example of the surface relief grating shown in FIG. 12A according to certain embodiments.

FIG. 12A is an atomic force microscopy (AFM) image of an example of a surface relief grating 1210 including a birefringent polymer according to certain embodiments. Surface relief grating 1210 may include a plurality of grating ridges 1212 and grating grooves 1214. Grating ridges 1212 may be etched in a birefringent polymer material layer, such as a layer of certain PEN or PET materials. For example, some PEN materials may have a refractive index $n_o$ for ordinary ray between about 1.5 and about 1.7, and a refractive index $n_e$ for extraordinary ray between about 1.7 and about 2.0. The optic axis of the birefringent polymer material layer may be parallel to grating ridges 1212, and thus surface relief grating 1210 may preferentially diffract s-polarized light as grating 1005 shown in FIG. 10C. Grating grooves 1214 may or may not be filled with an index matching material, such as an isotropic polymer with a refractive index matching $n_o$ of the birefringent polymer material layer.

FIG. 12B shows measured polarization contrast of surface relief grating 1210 shown in FIG. 12A according to certain embodiments. The polarization contrast shown in FIG. 12B may be the ratio of the amount of s-polarized light diffracted in the −1st order to the amount of p-polarized light diffracted in the −1st order. In FIG. 12B, the abscissa shows the wavelength of the incident light beam, the ordinate shows the incident angle of the light beam incident on surface relief grating 1210, and the log of the polarization contrast is shown by the color for the corresponding wavelength and incident angle of the light beam. For surface relief grating 1210 shown in FIG. 12A, the highest polarization contrast is measured when the incident light beam has an incident angle about 63° and a wavelength at about 668 nm.

FIG. 12C shows measured polarization contrast of surface relief grating 1210 shown in FIG. 12A according to certain embodiments. The polarization contrast shown in FIG. 12C may be the ratio of the amount of s-polarized light diffracted in the −1st order to the amount of p-polarized light diffracted in the −1st order. The abscissa in FIG. 12C shows the wavelength of the incident light beam, the ordinate shows the incident angle of the light beam incident on surface relief grating 1210, and the log of the polarization contrast is shown by the color for the corresponding wavelength and incident angle of the light beam.

Figure 13A:
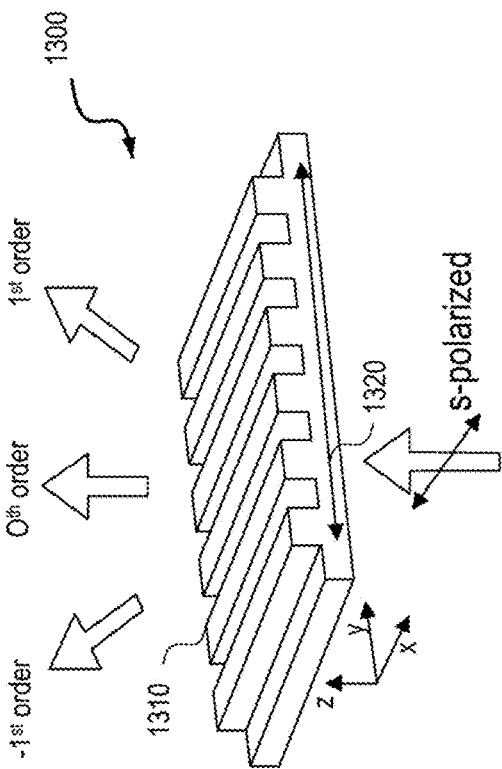
FIG. 13A illustrates diffraction of p-polarized wave by an example of a grating including a biaxial birefringent material with a first optical axis direction according to certain embodiments.

FIG. 13A illustrates diffraction of p-polarized wave by an example of a grating 1300 including a biaxial birefringent material according to certain embodiments. The biaxial birefringent material may include, for example, birefringent polymers (e.g., some PEN or PET materials), birefringent ceramics, aligned LCP including polymer/LCP mixtures, aligned epitaxial single crystal organic molecules, and the like. The biaxial birefringent material may have a birefringence greater than about 0.05-0.1, greater than about 0.15, greater than about 0.2, or greater than about 0.5. In the example shown in FIG. 13A, the biaxial birefringent material may include a biaxial birefringent polymer, such as certain PEN or PET materials. Grating 1300 may be a one-dimensional surface relief grating including a plurality of ridges 1310 arranged along the y direction, where each ridge 1310 may extend along the x direction. The pitch of grating 1300 may be greater than the wavelength of the incident light in grating 1300. Grating 1300 may or may not be coated with an index matching isotropic material (e.g., an isotropic polymer) to fill the grooves of grating 1300 with the index matching isotropic material.

In the example shown in FIG. 13A, at least one of the optic axes of the biaxial birefringent polymer in grating 1300 may be in the x-y plane, for example, in the x direction, y direction, or between the x and y directions. P-polarized light propagating in the biaxial birefringent polymer in a direction (e.g., z direction) perpendicular to an optic axis 1320 may vibrate in the y direction (e.g., along optic axis 1320). Thus, the electrical field of the incident light may be in a direction parallel to optical axis 1320 (or the direction of the extraordinary refractive index $n_e$ of the birefringent polymer). As shown by the simulation results below, the p-polarized light may be transmitted (e.g., refracted) by grating 1300 with little or no diffraction by grating 1300 as shown in FIG. 13A.

Figure 13B:
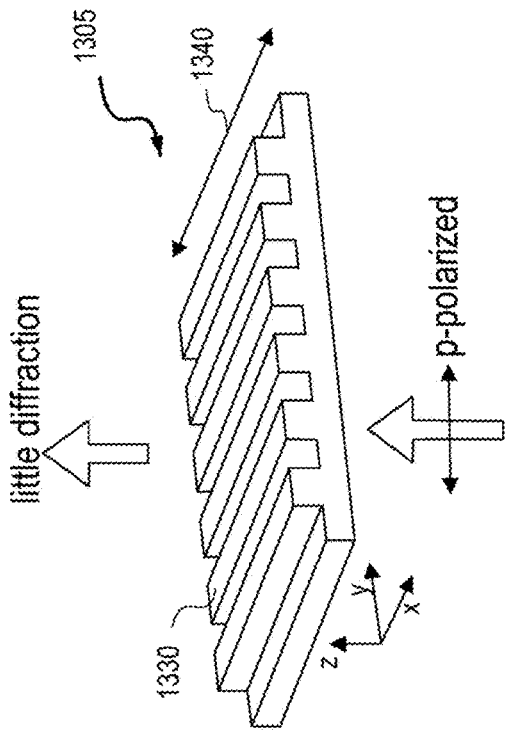
FIG. 13B illustrates diffraction of s-polarized wave by the example of grating including the biaxial birefringent material with the first optical axis direction according to certain embodiments.

FIG. 13B illustrates diffraction of s-polarized wave by grating 1300 including the biaxial birefringent material according to certain embodiments. As described above with respect to FIG. 13A, the biaxial birefringent polymer in grating 1300 may have optical axis 1320 in the x-y plane, for example, in the y direction. Thus, s-polarized light propagating in the biaxial birefringent polymer in a direction perpendicular to optic axis 1320 may vibrate in the x direction (e.g., perpendicular to optic axis 1320). Thus, the electrical field of the incident light may be in a direction perpendicular to optical axis 1320 (or the direction of the extraordinary refractive index $n_e$ of the birefringent polymer). As shown by the simulation results below, the s-polarized light may be diffracted by grating 1300 into, for example, −1st, 0th, or +1st orders in different directions with respect to the surface normal direction of grating 1300 as shown in FIG. 11B. In this way, grating 1300 may selectively diffract s-polarized light and transmit p-polarized light.

Figure 13C:
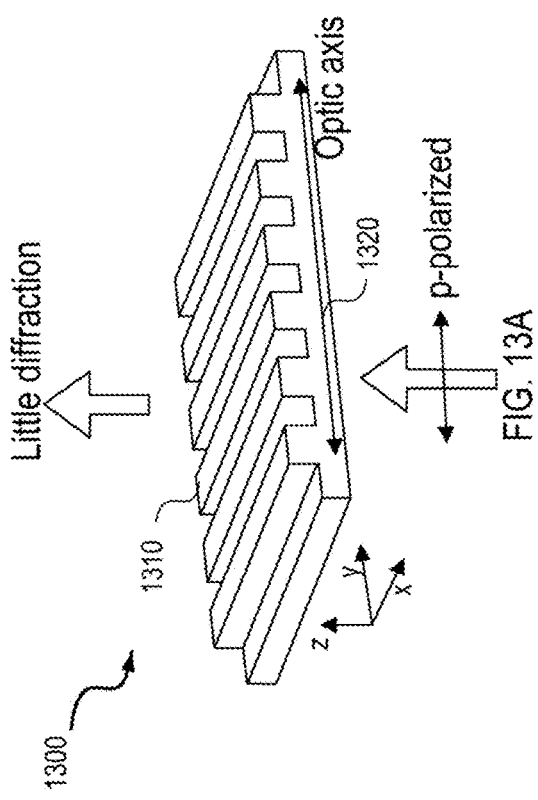
FIG. 13C illustrates diffraction of s-polarized wave by an example of a grating including a biaxial birefringent material with a second optical axis direction according to certain embodiments.

FIG. 13C illustrates diffraction of s-polarized wave by an example of a grating 1305 including a biaxial birefringent material according to certain embodiments. The biaxial birefringent material may include, for example, birefringent polymers (e.g., certain PEN or PET materials), birefringent ceramics, aligned LCP including polymer/LCP mixtures, aligned epitaxial single crystal organic molecules, and the like. The biaxial birefringent material may have a birefringence greater than about 0.05-0.1, greater than about 0.15, greater than about 0.2, or greater than about 0.5. In the example shown in FIG. 13C, the biaxial birefringent material may include a biaxial birefringent polymer, such as certain PEN or PET materials. Grating 1305 may be a one-dimensional surface relief grating including a plurality of ridges 1310 arranged along the y direction, where each ridge 1310 may extend along the x direction. The pitch of grating 1305 may be greater than the wavelength of the incident light in grating 1305. Grating 1305 may or may not be coated with an index matching isotropic material (e.g., an isotropic polymer) to fill the grooves of grating 1305 with the index matching isotropic material.

In the example shown in FIG. 13C, an optic axis of the biaxial birefringent polymer in grating 1305 may be in the x-y plane. For example, an optic axis 1340 of the biaxial birefringent polymer may be in the y direction. S-polarized light propagating in the biaxial birefringent polymer in a direction (e.g., z direction) perpendicular to optic axis 1340 may vibrate in the x direction (e.g., along optic axis 1340). Thus, the electrical field of the incident light may be in a direction parallel to optical axis 1340 (or the direction of the extraordinary refractive index $n_e$ of the birefringent polymer). As shown by the simulation results below, the s-polarized light may be diffracted by grating 1305 into, for example, −1st, 0th, or +1st orders in different directions with respect to the surface normal direction of grating 1305 as shown in FIG. 13C.

Figure 13D:
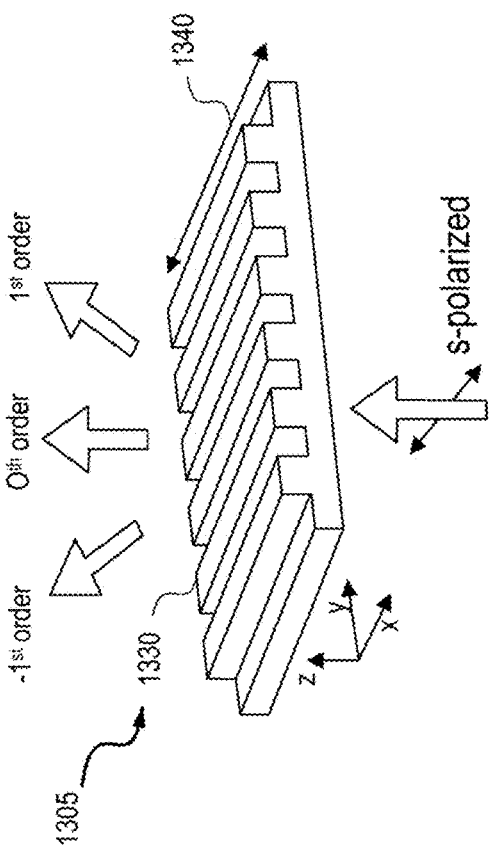
FIG. 13D illustrates diffraction of p-polarized wave by the example of grating including the biaxial birefringent material with the second optical axis direction according to certain embodiments.

FIG. 13D illustrates diffraction of p-polarized wave by grating 1305 including the biaxial birefringent material according to certain embodiments. As described above with respect to FIG. 13C, the biaxial birefringent polymer in grating 1305 may have optical axis 1340 in the x-y plane, for example, in the x direction. Thus, p-polarized light propagating in the biaxial birefringent polymer in a direction perpendicular to optic axis 1340 may vibrate in the y direction (e.g., perpendicular to optic axis 1340). Thus, the electrical field of the incident light may be in a direction perpendicular to optical axis 1340 (or the direction of the extraordinary refractive index $n_e$ of the birefringent polymer). As shown by the simulation results below, the p-polarized light may be transmitted (e.g., refracted) by grating 1305 with little or no diffraction as shown in FIG. 13D. In this way, grating 1305 may also selectively diffract s-polarized light and transmit p-polarized light.

Figure 14A:
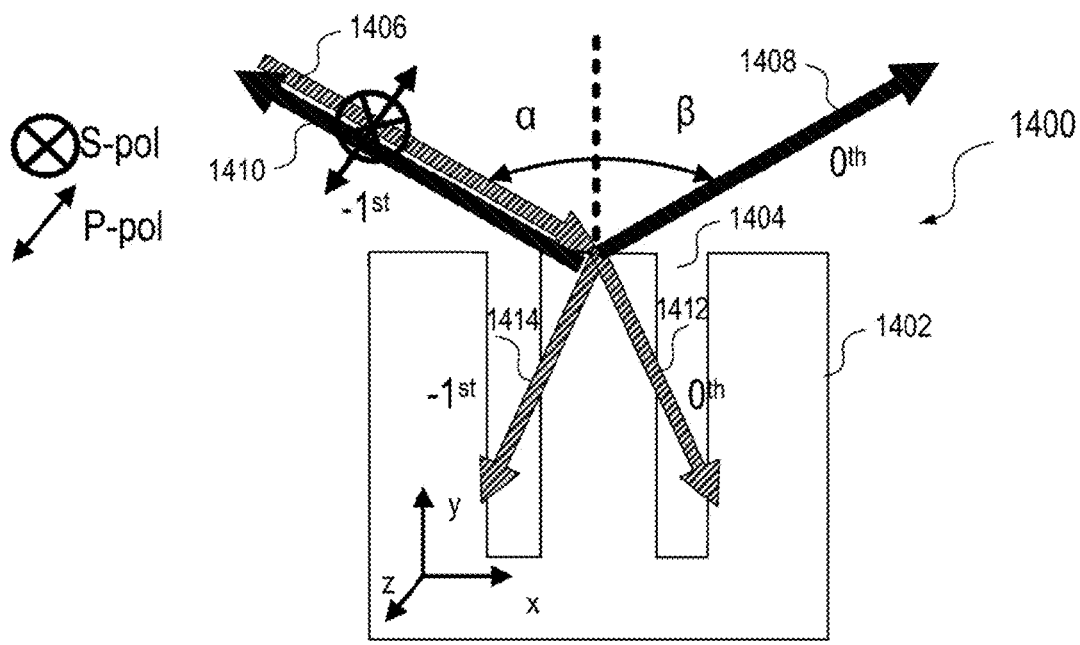
FIG. 14A illustrates an example of a surface relief grating including a biaxial birefringent material and without an index matching overcoat layer according to certain embodiments.

FIG. 14A illustrates an example of a surface relief grating 1400 including a biaxial birefringent material and without an index matching overcoat layer according to certain embodiments. Surface relief grating 1400 may include a plurality of ridges 1402 and a plurality of grooves 1404. The plurality of ridges 1402 may include the biaxial birefringent material, such as, for example, certain PEN or PET polymers. Grooves 1404 may be air gaps that may not be filled with an index matching material.

In the example shown in FIG. 14A, surface relief grating 1400 may operate in the Littrow configuration for a target wavelength about 620 nm, and may be designed such that only −1st order diffraction may exist. When surface relief grating 1400 operates in the reflection mode, the incidence angle and the diffraction angle of the diffraction order with the highest diffraction efficiency may be the same. Thus, for incident light beam 1406 (which may be s or p polarized), the 0th order diffraction (reflection) may be shown by a light ray 1408 and the −1st order diffract may be shown by a light ray 1410. When surface relief grating 1400 operates in the transmission mode, for incident light beam 1406, the 0th order diffraction (refraction) may be shown by a light ray 1412 and the −1st order diffraction may be shown by a light ray 1414.

Figure 14B:
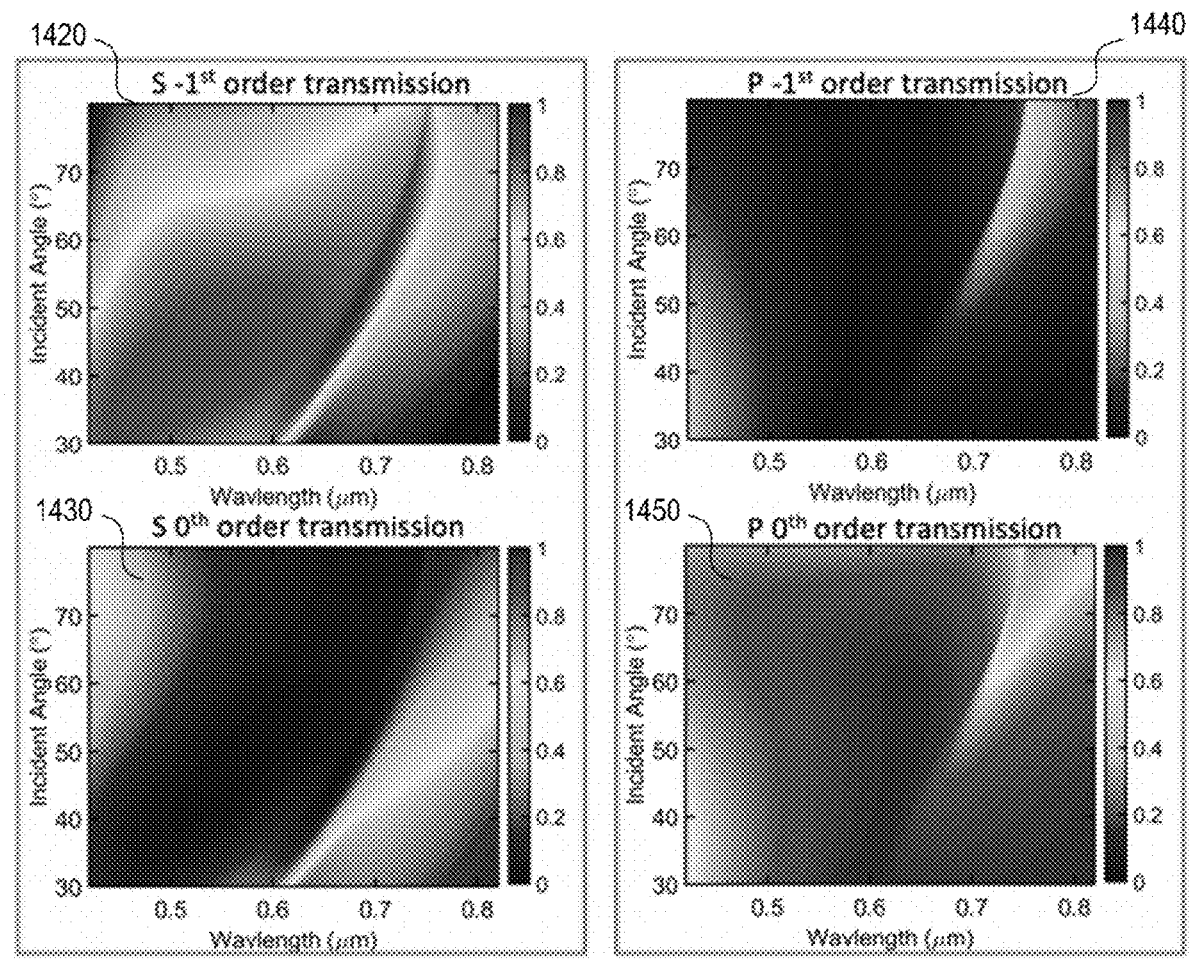
FIG. 14B illustrates simulated performance of the surface relief grating of FIG. 14A for light of different polarization states according to certain embodiments.

FIG. 14B illustrates examples of simulated performance of surface relief grating 1400 of FIG. 14A operating in the Littrow configuration and transmission mode for incident light of different polarization states according to certain embodiments. FIG. 14B shows the intensities of the 0th order diffraction (e.g., light ray 1412) and the −1st order diffraction (e.g., light ray 1414) for incident light of two different polarization states (e.g., s and p polarization). A diagram 1420 shows the diffraction efficiencies of the −1st order diffraction for s-polarized light with different wavelengths and incident angles, where different diffraction efficiencies are shown by different colors. A diagram 1430 shows the diffraction efficiencies of the 0th order diffraction for s-polarized light with different wavelengths and incident angles, where different diffraction efficiencies are shown by different colors. In diagrams 1420 and 1430, the abscissa corresponds to the wavelength of incident light beam 1406, and the ordinate corresponds to the incident angle of incident light beam 1406. Diagrams 1420 and 1430 indicate that, for s-polarized light, the −1st order diffraction can have a much higher diffraction efficiency than the 0th order diffraction.

A diagram 1440 in FIG. 14B shows the diffraction efficiencies of the −1st order diffraction for p-polarized light with different wavelengths and incident angles, where different diffraction efficiencies are shown by different colors. A diagram 1450 shows the diffraction efficiencies of the 0th order diffraction for p-polarized light with different wavelengths and incident angles, where different diffraction efficiencies are shown by different colors. In diagrams 1440 and 1450, the abscissa corresponds to the wavelength of incident light beam 1406, and the ordinate corresponds to the incident angle of incident light beam 1406. Diagrams 1440 and 1450 indicate that, for p-polarized light, the −1st order diffraction can have a much lower diffraction efficiency than the 0th order diffraction. Thus, surface relief grating 1400 may have a much higher −1st order diffraction efficiency for s polarized light than for p polarized light.

From diagrams 1420 and 1440, the polarization contrast of the −1st order diffraction between s-polarized light and p-polarized light can be determined. For example, for light at about 650 nm and incident on surface relief grating 1400 at an incidence angle about 50°, the polarization contrast can be greater than $1 \times 10^8$. Thus, surface relief grating 1400 can be highly polarization sensitive.

Figure 15A:
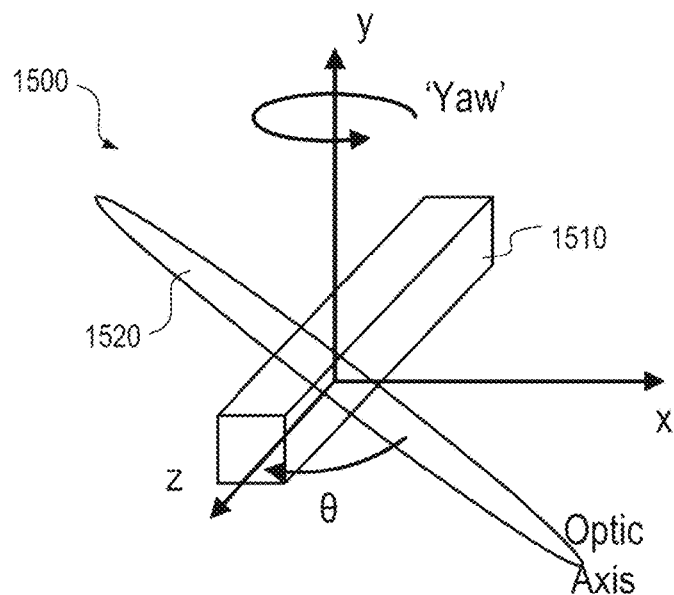
FIG. 15A illustrates an example of a surface relief grating including a biaxial birefringent material and an index matching overcoat layer according to certain embodiments.

FIG. 15A illustrates an example of a surface relief grating 1500 including a biaxial birefringent material and an index matching overcoat layer according to certain embodiments. In FIG. 15A, a single grating ridge 1510 of surface relief grating 1500 is shown, where grating ridge 1510 may extend along the z direction with a cross-section in the x-y plane. Grating ridge 1510 may include a biaxial birefringent material with an optic axis 1520 in the x-z plane. The angle between optic axis 1520 and grating ridge 1510 (e.g., the z direction) is 0.

Figure 15B:
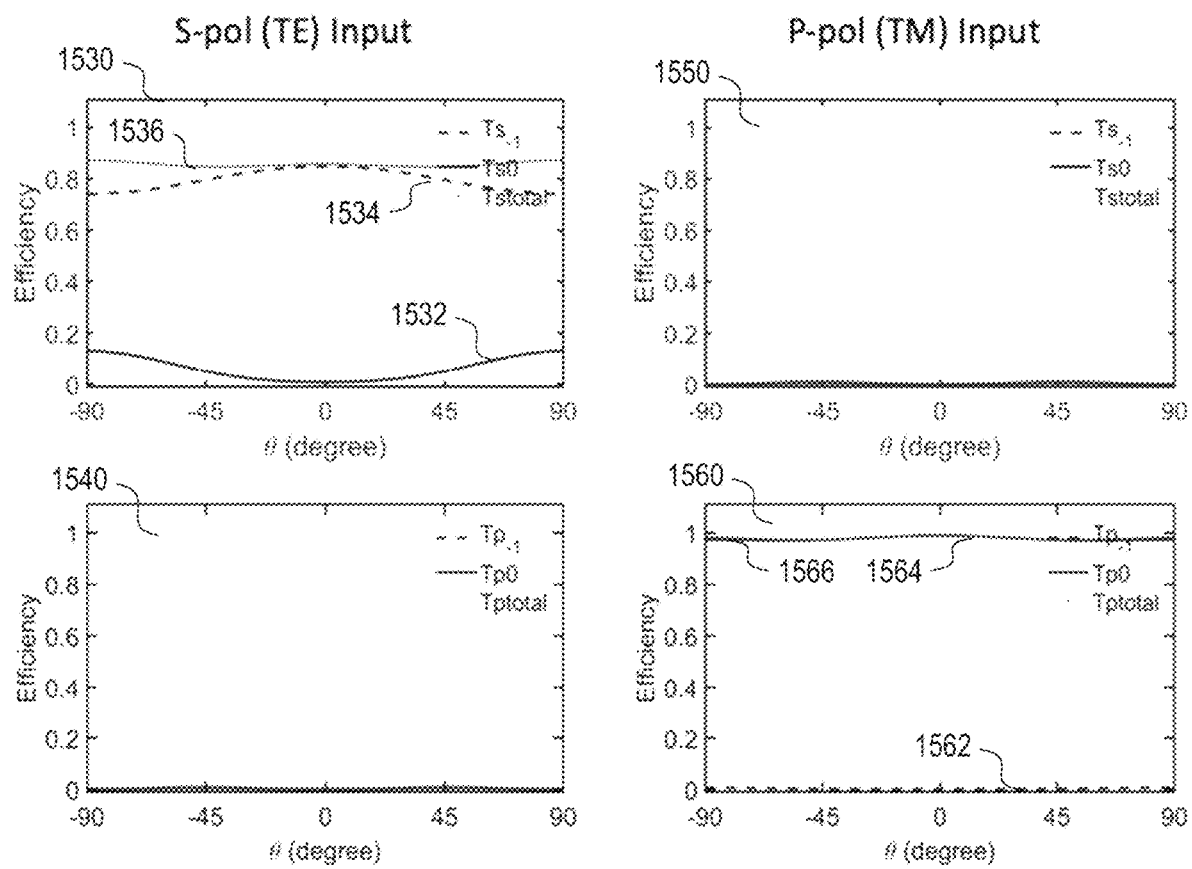
FIG. 15B illustrates simulated performance of the surface relief grating of FIG. 15A for light of different polarization states according to certain embodiments.

FIG. 15B illustrates simulated performance of surface relief grating 1500 of FIG. 15A for light of different polarization states according to certain embodiments. A diagram 1530 shows the diffraction efficiencies for s-polarized light by surface relief grating 1500 with different optic axis orientations. In diagram 1530, the abscissa corresponds to angle θ between optic axis 1520 and grating ridge 1510 (e.g., the z direction), and the ordinate corresponds to the diffraction efficiency. A curve 1532 represents the efficiencies (or proportions) of s-polarized light in the 0th order diffraction (undiffracted or refracted) by surface relief grating 1500 with different optic axis orientations when the input light is s-polarized. A curve 1534 represents the efficiencies (or proportions) of s-polarized light in the −1st order diffraction by surface relief grating 1500 with different optic axis orientations when the input light is s-polarized. A curve 1536 represents the total efficiencies of s-polarized light including the −1st order diffraction and 0th order diffraction by surface relief grating 1500 with different optic axis orientations when the input light is s-polarized. Diagram 1530 indicates that the diffraction efficiency for the −1st order diffraction is close to 100% when optic axis 1520 is parallel to grating ridge 1510 (e.g., the z direction), and is close to 90% when optic axis 1520 is perpendicular to grating ridge 1510 (e.g., the x direction).

A diagram 1540 shows that the efficiencies of p-polarized light in the 0th order, −1st order, and total light diffracted by surface relief grating 1500 with different optic axis orientations are close to zero when the input light is s-polarized. Thus, polarization conversion from s-polarized light to p-polarized light caused by the diffraction by surface relief grating 1500 is very low. Therefore, when the input light is s-polarized, the 0th order, −1st order, and total light diffracted by surface relief grating 1500 are mainly s-polarized light. The polarization contrast in the −1st order diffraction can be very high for s-polarized input light.

A diagram 1550 shows the diffraction efficiencies for p-polarized light by surface relief grating 1500 with different optic axis orientations. In diagram 1550, the abscissa corresponds to angle θ between optic axis 1520 and grating ridge 1510 (e.g., the z direction), and the ordinate corresponds to the diffraction efficiency. Diagram 1550 shows that the efficiencies of s-polarized light in the 0th order, −1st order, and total light diffracted by surface relief grating 1500 with different optic axis orientations are close to zero when the input light is p-polarized. Thus, polarization conversion from p-polarized light to s-polarized light caused by the diffraction by surface relief grating 1500 is very low. Therefore, when the input light is p-polarized, the 0th order, −1st order, and total light diffracted by surface relief grating 1500 are mainly p-polarized light.

A diagram 1560 shows the diffraction efficiencies for p-polarized light by surface relief grating 1500 with different optic axis orientations. A curve 1562 represents the efficiencies (or proportions) of p-polarized light in the −1st order diffraction by surface relief grating 1500 with different optic axis orientations when the input light is p-polarized. Curve 1562 shows that the efficiencies of p-polarized light in the −1st order diffraction by surface relief grating 1500 is close to zero. A curve 1564 represents the efficiencies (or proportions) of p-polarized light in the 0th order diffraction by surface relief grating 1500 with different optic axis orientations when the input light is p-polarized. Curve 1564 shows that the efficiencies of p-polarized light in the 0th order diffraction (undiffracted p-polarized light) by surface relief grating 1500 is close to 100%. A curve 1566 represents the total efficiencies of p-polarized light including the −1st order diffraction and 0th order diffraction by surface relief grating 1500 with different optic axis orientations when the input light is p-polarized. Diagram 1560 indicates that the diffraction efficiency for the −1st order diffraction is close to 0% for −polarized incident light.

FIGS. 14B and 15B show that, when biaxial birefringent material is used in the surface relief grating and an optic axis of the biaxial birefringent material is in a plane including the grating vector (e.g., in x direction) and a lateral extension direction (e.g., in z direction) of ridge 1510, such as the x-z plane, s-polarized light (light vibrated in a direction parallel to the grating ridges or grooves) can be diffracted into s-polarized −1st diffraction order with a high diffraction efficiency, for angle θ between the optic axis and the grating ridge (e.g., the z direction) from about −90° to about 90°. The same surface relief grating may have a very low (e.g., close to zero) −1st order diffraction efficiency and a very high 0th order diffraction (undiffracted light) efficiency for p-polarized incident light, for angle θ between the optic axis and the grating ridge (e.g., the z direction) from about −90° to about 90°. Thus, surface relief gratings made using biaxial birefringent materials with or without the index matching overcoat layer can be polarization sensitive, and similar polarization-sensitive diffraction performance can be achieved even if the optic axis rotates in a plane including the grating vector and perpendicular to the surface normal direction of the surface relief grating.

Embodiments of the invention may be used to implement components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 16:
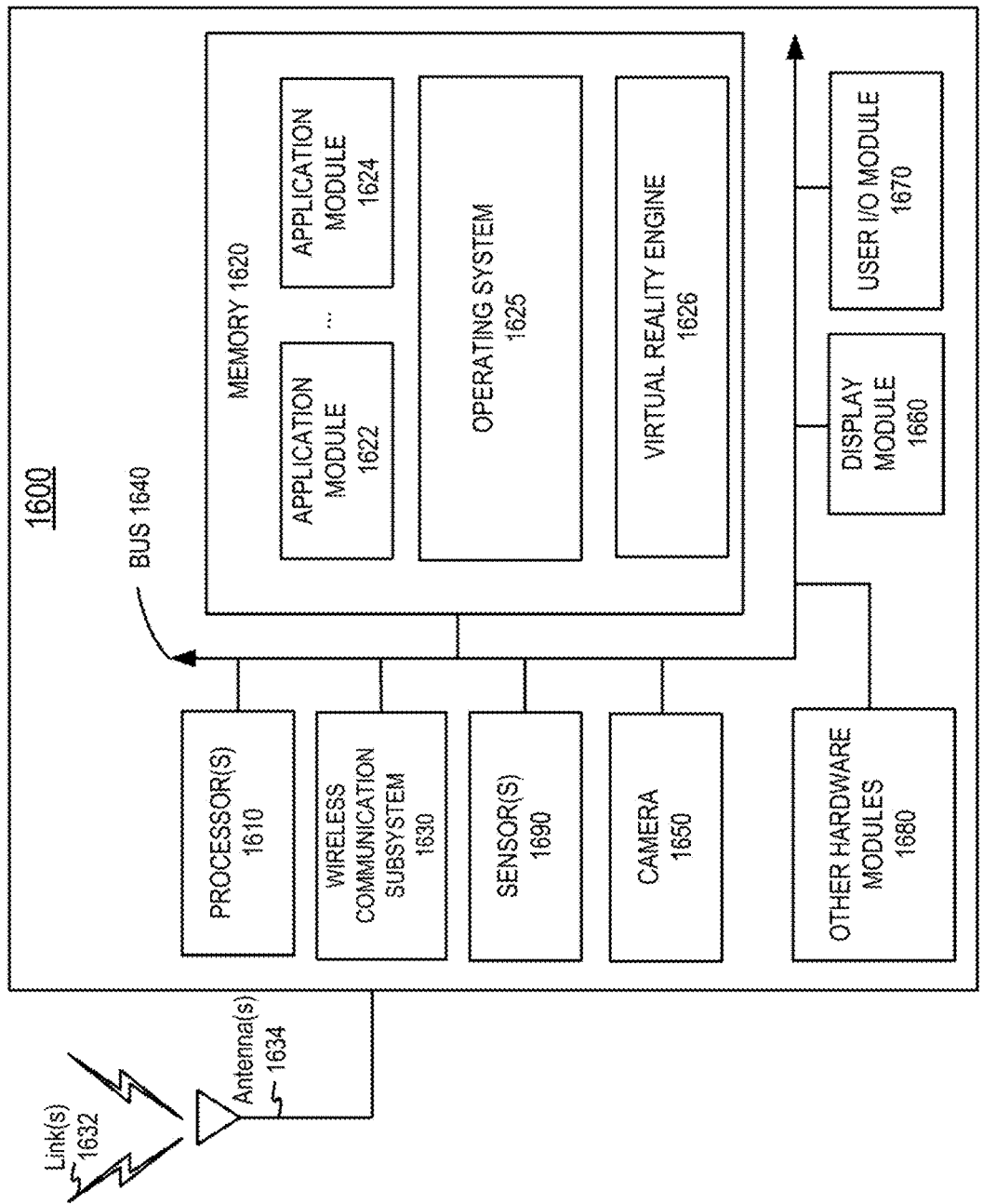
FIG. 16 is a simplified block diagram of an example electronic system of an example near-eye display according to certain embodiments.

FIG. 16 is a simplified block diagram of an example electronic system 1600 of an example near-eye display (e.g., HMD device) for implementing some of the examples disclosed herein. Electronic system 1600 may be used as the electronic system of an HMD device or other near-eye displays described above. In this example, electronic system 1600 may include one or more processor(s) 1610 and a memory 1620. Processor(s) 1610 may be configured to execute instructions for performing operations at a number of components, and can be, for example, a general-purpose processor or microprocessor suitable for implementation within a portable electronic device. Processor(s) 1610 may be communicatively coupled with a plurality of components within electronic system 1600. To realize this communicative coupling, processor(s) 1610 may communicate with the other illustrated components across a bus 1640. Bus 1640 may be any subsystem adapted to transfer data within electronic system 1600. Bus 1640 may include a plurality of computer buses and additional circuitry to transfer data.

Memory 1620 may be coupled to processor(s) 1610. In some embodiments, memory 1620 may offer both short-term and long-term storage and may be divided into several units. Memory 1620 may be volatile, such as static random access memory (SRAM) and/or dynamic random access memory (DRAM) and/or non-volatile, such as read-only memory (ROM), flash memory, and the like. Furthermore, memory 1620 may include removable storage devices, such as secure digital (SD) cards. Memory 1620 may provide storage of computer-readable instructions, data structures, program modules, and other data for electronic system 1600. In some embodiments, memory 1620 may be distributed into different hardware modules. A set of instructions and/or code might be stored on memory 1620. The instructions might take the form of executable code that may be executable by electronic system 1600, and/or might take the form of source and/or installable code, which, upon compilation and/or installation on electronic system 1600 (e.g., using any of a variety of generally available compilers, installation programs, compression/decompression utilities, etc.), may take the form of executable code.

In some embodiments, memory 1620 may store a plurality of application modules 1622 through 1624, which may include any number of applications. Examples of applications may include gaming applications, conferencing applications, video playback applications, or other suitable applications. The applications may include a depth sensing function or eye tracking function. Application modules 1622-4924 may include particular instructions to be executed by processor(s) 1610. In some embodiments, certain applications or parts of application modules 1622-4924 may be executable by other hardware modules 1680. In certain embodiments, memory 1620 may additionally include secure memory, which may include additional security controls to prevent copying or other unauthorized access to secure information.

In some embodiments, memory 1620 may include an operating system 1625 loaded therein. Operating system 1625 may be operable to initiate the execution of the instructions provided by application modules 1622-4924 and/or manage other hardware modules 1680 as well as interfaces with a wireless communication subsystem 1630 which may include one or more wireless transceivers. Operating system 1625 may be adapted to perform other operations across the components of electronic system 1600 including threading, resource management, data storage control and other similar functionality.

Wireless communication subsystem 1630 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1600 may include one or more antennas 1634 for wireless communication as part of wireless communication subsystem 1630 or as a separate component coupled to any portion of the system. Depending on desired functionality, wireless communication subsystem 1630 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1630 may permit data to be exchanged with a network, other computer systems, and/or any other devices described herein. Wireless communication subsystem 1630 may include a means for transmitting or receiving data, such as identifiers of HMD devices, position data, a geographic map, a heat map, photos, or videos, using antenna(s) 1634 and wireless link(s) 1632. Wireless communication subsystem 1630, processor (s) 1610, and memory 1620 may together comprise at least a part of one or more of a means for performing some functions disclosed herein.

Embodiments of electronic system 1600 may also include one or more sensors 1690. Sensor(s) 1690 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1690 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1600 may include a display module 1660. Display module 1660 may be a near-eye display, and may graphically present information, such as images, videos, and various instructions, from electronic system 1600 to a user. Such information may be derived from one or more application modules 1622-4924, virtual reality engine 1626, one or more other hardware modules 1680, a combination thereof, or any other suitable means for resolving graphical content for the user (e.g., by operating system 1625). Display module 1660 may use liquid crystal display (LCD) technology, light-emitting diode (LED) technology (including, for example, OLED, ILED, µLED, AMOLED, TOLED, etc.), light emitting polymer display (LPD) technology, or some other display technology.

Electronic system 1600 may include a user input/output module 1670. User input/output module 1670 may allow a user to send action requests to electronic system 1600. An action request may be a request to perform a particular action. For example, an action request may be to start or end an application or to perform a particular action within the application. User input/output module 1670 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1600. In some embodiments, user input/output module 1670 may provide haptic feedback to the user in accordance with instructions received from electronic system 1600. For example, the haptic feedback may be provided when an action request is received or has been performed.

Electronic system 1600 may include a camera 1650 that may be used to take photos or videos of a user, for example, for tracking the user's eye position. Camera 1650 may also be used to take photos or videos of the environment, for example, for VR, AR, or MR applications. Camera 1650 may include, for example, a complementary metal-oxide-semiconductor (CMOS) image sensor with a few millions or tens of millions of pixels. In some implementations, camera 1650 may include two or more cameras that may be used to capture 3-D images.

In some embodiments, electronic system 1600 may include a plurality of other hardware modules 1680. Each of other hardware modules 1680 may be a physical module within electronic system 1600. While each of other hardware modules 1680 may be permanently configured as a structure, some of other hardware modules 1680 may be temporarily configured to perform specific functions or temporarily activated. Examples of other hardware modules 1680 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 1680 may be implemented in software.

In some embodiments, memory 1620 of electronic system 1600 may also store a virtual reality engine 1626. Virtual reality engine 1626 may execute applications within electronic system 1600 and receive position information, acceleration information, velocity information, predicted future positions, or some combination thereof of the HMD device from the various sensors. In some embodiments, the information received by virtual reality engine 1626 may be used for producing a signal (e.g., display instructions) to display module 1660. For example, if the received information indicates that the user has looked to the left, virtual reality engine 1626 may generate content for the HMD device that mirrors the user's movement in a virtual environment. Additionally, virtual reality engine 1626 may perform an action within an application in response to an action request received from user input/output module 1670 and provide feedback to the user. The provided feedback may be visual, audible, or haptic feedback. In some implementations, processor(s) 1610 may include one or more GPUs that may execute virtual reality engine 1626.

In various implementations, the above-described hardware and modules may be implemented on a single device or on multiple devices that can communicate with one another using wired or wireless connections. For example, in some implementations, some components or modules, such as GPUs, virtual reality engine 1626, and applications (e.g., tracking application), may be implemented on a console separate from the head-mounted display device. In some implementations, one console may be connected to or support more than one HMD.

In alternative configurations, different and/or additional components may be included in electronic system 1600. Similarly, functionality of one or more of the components can be distributed among the components in a manner different from the manner described above. For example, in some embodiments, electronic system 1600 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A waveguide display comprising:
   a substrate transparent to at least one of visible or near infrared light; and
   a surface relief grating on the substrate, wherein:
     the surface relief grating includes ridges formed using a birefringent material and is configured to:
       diffract incident light in a first polarization state from a light source into the substrate, or diffract the incident light in the first polarization state and propagating within the substrate out of the substrate towards an eye of a user; and
       transmit incident light in a second polarization state orthogonal to the first polarization state without changing a propagation direction of the incident light in the second polarization state; and
     the birefringent material in the ridges is characterized by an optic axis in a constant direction parallel to a plane that includes a grating vector of the surface relief grating.

2. The waveguide display of claim 1, wherein the birefringent material is characterized by a birefringence greater than 0.05.

3. The waveguide display of claim 2, wherein the birefringent material is characterized by the birefringence greater than 0.1.

4. The waveguide display of claim 1, wherein the birefringent material includes at least one of a birefringent polymer, a birefringent ceramic, an aligned liquid crystal polymer, or aligned single crystal organic molecules.

5. The waveguide display of claim 4, wherein the birefringent material includes polyethylene naphthalate (PEN) or polyethylene terephthalate.

6. The waveguide display of claim 1, wherein the birefringent material includes a uniaxial birefringent material or a biaxial birefringent material.

7. The waveguide display of claim 1, wherein the plane includes the grating vector of the surface relief grating and a lateral extension direction of the ridges.

8. The waveguide display of claim 1, further comprising an overcoat layer characterized by a refractive index matching a refractive index of the birefringent material.

9. The waveguide display of claim 1, wherein the surface relief grating includes a transmissive grating or a reflective grating.

10. The waveguide display of claim 1, wherein the surface relief grating is configured to diffract the incident light in the first polarization state from the light source into the substrate at a first angle such that the incident light coupled into the substrate propagates within the substrate through total internal reflection.

11. The waveguide display of claim 10, further comprising a second grating configured to selectively couple the incident light in the first polarization state and propagating within the substrate out of the substrate.

12. The waveguide display of claim 1, further comprising a light source or a polarizer configured to generate the incident light in the first polarization state.

13. The waveguide display of claim 1, wherein the birefringent material in the ridges is characterized by a higher index axis parallel to the plane that includes the grating vector of the surface relief grating.

14. The waveguide display of claim 1, wherein the surface relief grating includes a one-dimensional grating or a two-dimensional grating.

15. The waveguide display of claim 1, further comprising:
   a polarization selective reflective layer on the substrate and configured to reflect light in the second polarization state, wherein the polarization selective reflective layer and the surface relief grating are on opposite sides of the substrate; or
   a second grating on the substrate and configured to reflectively diffract light in the second polarization state, wherein the second grating and the surface relief grating are on opposite sides of the substrate.

16. A surface relief grating comprising:
   a substrate; and
   a plurality of ridges formed using a birefringent material, wherein the birefringent material in the plurality of ridges is characterized by an optic axis in a constant direction parallel to a plane that includes a grating vector of the surface relief grating such that the surface relief grating is configured to:
     diffract incident light in a first polarization state from a light source into the substrate, or diffract the incident light in the first polarization state and propagating within the substrate out of the substrate towards an eye of a user; and;
     transmit incident light in a second polarization state orthogonal to the first polarization state without changing a propagation direction of the incident light in the second polarization state.

17. The surface relief grating of claim 16, wherein the substrate includes a reflective surface.

18. The surface relief grating of claim 16, wherein the birefringent material includes a uniaxial or biaxial birefringent material that includes at least one of a birefringent polymer, a birefringent ceramic, an aligned liquid crystal polymer, or aligned single crystal organic molecules and is characterized by a birefringence greater than 0.1.

19. The surface relief grating of claim 16, wherein the plurality of ridges includes a two-dimensional array of three-dimensional microstructures.

20. The surface relief grating of claim 19, wherein the two-dimensional array of three-dimensional microstructures includes at least one of cylindrical pillars, cuboidal pillars, cavities, or pyramids.

21. The surface relief grating of claim 16, wherein:
the birefringent material includes a uniaxial birefringent material; and
the optic axis is parallel to a polarization direction of the incident light in the first polarization state.

22. The surface relief grating of claim 16, wherein the plurality of ridges is characterized by a pitch greater than a wavelength of the incident light in the surface relief grating.

23. The surface relief grating of claim 16, further comprising an overcoat layer on the plurality of ridges, the overcoat layer characterized by a refractive index matching a refractive index of the birefringent material.

* * * * *